US006713551B2

(12) United States Patent
Takahashi et al.

(10) Patent No.: US 6,713,551 B2
(45) Date of Patent: Mar. 30, 2004

(54) RESIN COMPOSITION FOR COATING AND COATING COMPOSITION FOR CURING

(75) Inventors: Kunio Takahashi, Takatsuki (JP); Naoki Kodama, Suita (JP); Masaya Yoshida, Hameji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 346 days.

(21) Appl. No.: 09/906,703

(22) Filed: Jul. 18, 2001

(65) Prior Publication Data

US 2002/0040094 A1 Apr. 4, 2002

(51) Int. Cl.[7] .............................. C08J 3/00; C08K 3/20; C08L 75/00
(52) U.S. Cl. ........................ 524/500; 524/507; 524/589; 524/590; 524/591; 524/839; 524/840; 525/54.26; 525/123; 525/124; 525/131; 525/404; 525/455
(58) Field of Search ................................ 524/507, 589, 524/591, 590, 839, 84, 500, 502; 525/54.26, 123, 124, 131, 455, 404

(56) References Cited

U.S. PATENT DOCUMENTS

| 3,304,273 A | | 2/1967 | Stamberger |
| 5,239,028 A | * | 8/1993 | Nakagawa et al. |
| 5,763,527 A | * | 6/1998 | Chen et al. |
| 5,989,715 A | | 11/1999 | Kiriazis et al. |
| 6,130,285 A | * | 10/2000 | Melchiors et al. |

FOREIGN PATENT DOCUMENTS

| JP | 08165325 | 6/1996 |
| JP | 09221627 | 8/1997 |
| WO | WO-94/10221 | 5/1994 |

* cited by examiner

*Primary Examiner*—Patrick D Niland
(74) *Attorney, Agent, or Firm*—Connolly Bove Lodge & Hutz LLP

(57) ABSTRACT

The present inventors provides polyol-containing resin compositions for coatings which can give cured coating films having high hardness and at the same time high solid compositions to meet the recent resources saving and/or environmental protection requirements, and curable coating compositions having high reactivity at curing, giving the coating film with good appearance and the coatings with prolonged pot life.

The invention is directed to a resin composition for coatings comprising a polyol (A1) or (A2), a polyether polyol (B) and a solvent (C), wherein the polyol (A1) comprises a hydroxyl-containing polymerizable unsaturated monomer and a ring structure-containing polymerizable unsaturated monomer as essential components and the polyol (A2) comprises a hydroxyl-containing polymerizable unsaturated monomer and a linear branched structure-containing polymerizable unsaturated monomer as essential components.

8 Claims, No Drawings

RESIN COMPOSITION FOR COATING AND COATING COMPOSITION FOR CURING

FIELD OF THE INVENTION

The present invention relates to a resin composition for coatings and to a coating composition for curing (curable coating composition).

PRIOR ART

Polyol-containing resin compositions for coatings are applied in curable coating compositions or the like which are applied to various substrates for protecting and decorating the surface thereof. Such curable coating compositions are required to give cured coating films having a high luster as well as a high surface hardness without brittleness, namely hardness and flexibility, so that when widely applied to such structures as buildings, plants, tanks and bridges, and to automobiles, ships, industrial equipment, various industrial products and so forth, they can perform improved protective and decorative and other functions, protecting the substrate surface from mechanical shocks and the like and maintaining the substrate appearance. Flexibility contributes to improvements in processability as well. It is also demanded that the coating films, when exposed to outdoor conditions, show a high level of weathering resistance, since the maintenance cost can be reduced if those functions can be maintained for a prolonged period of time.

In Japanese Kokai Publication Sho-64-75571, there is disclosed a resin composition for coatings which comprises, as a main component, a urethane-modified resin obtained by reacting at least one polymer polyol selected from among polyester polyols, acrylic polyols and polyether polyols with an organic diisocyanate. This resin composition for coatings can form coating films with or without using a crosslinking agent such as a melamine resin and give coating films balanced between hardness and flexibility. However, the viscosity of the composition increases due to urethane bonds occurring in the resin skeleton. Thus, there is room for improvement in applicability through viscosity reduction or for contrivance to prepare high solid compositions to meet the recent resources saving and/or environmental protection requirements.

In Japanese Kokai Publication Hei-09-221627, there is disclosed a resin composition for use in urethane coating compositions for concrete coating form plywood panel which comprises a polyol-modified acrylic resin and a polyisocyanate compound incorporated therein. This resin composition for coatings is a solventless one resulting from the use of the polyol-modified acrylic resin, hence is excellent in resources saving and environmental protection. However, for applying the composition in various fields, the coatings or coating films are not yet satisfactory in hardness. In addition, there is room for contrivance to further increase the hardness and thus attain hardness and flexibility simultaneously.

Therefore, with these polyol-containing compositions for coatings, it is not possible to provide coatings with both hardness and flexibility simultaneously while forming cured coating films high in luster and excellent in weathering resistance, thus further improving the performance and quality of the coating films, and, since the hardness and flexibility of coating films are properties incompatible with each other. It is also impossible to satisfy the resources saving and environmental protection requirements by providing high solid compositions while meeting the performance requirements mentioned above.

Meanwhile, among polyurethane resin-based coatings, there is a reaction curing type one capable of forming urethane bonds by reaction of hydroxyl groups with isocyanato groups in the process of drying and, for promoting this reaction, methods are known, for example the method comprising providing the resin with an internal pendant acid value and the method comprising adding an external catalyst such as a tin catalyst. However, if the reactivity for curing is increased to a sufficient extent by using these two techniques, problems may arise, for example the coating films obtained may be poor in appearance and, in the case of two component type coating compositions, the pot life (working life) may become short. Thus there is room for contrivance to sufficiently increase the reactivity of such resin-based coating in the step of curing and, at the same time, improve the appearance of coating films formed and maintain the pot life of the film.

In view of the above-mentioned state of the art, it is an object of the present invention to provide a resin composition for coatings and a curable coating composition which can give cured coating films having excellent basic properties, inclusive of high luster and high weathering resistance, as well as high hardness and good flexibility and which not only satisfy the above performance requirements but also have a high solid content and thus can meet the resources saving and environmental protection requirements. Another object of the invention is to provide a curable coating composition which shows high reactivity in the step of curing and can form coatings having a good appearance and can sufficiently maintain the pot life thereof.

SUMMARY OF THE INVENTION

The present inventors closely examined the problems with polyol-containing resin compositions for coatings such as curable coating compositions and made intensive, investigations accordingly and, as a result, found that a resin composition for coatings, when it contains a polyol (A1) having a specific proportion of a ring structure, it can give cured coating high in luster and hardness and, when it contains a polyether polyol (B) capable of providing flexibility, it can give cured coating films having high hardness and at the same time good flexibility and, further, that when the polyol (A1) has a cycloalkyl group, among others, as the ring structure, the weathering resistance can be further improved. Furthermore, they revealed the fact that when the polyether polyol (B) is used in a specific amount, a high solid content, which is a preferred mode of a resin composition for coatings, can dramatically be attained in addition to the above-mentioned physical properties of cured coating films. These findings have now led to completion of the present invention.

When a polyol formed by using a specific linear branched structure-containing polymerizable unsaturated monomer as an essential starting material is used in a resin composition for coatings, the viscosity of the resin composition can be reduced (hence the composition can have a high solid content) but the coating films obtained are inferior in hardness as compared with the case where a ring structure-containing polyol (A1) is used. It was found that when a polyol (A2) designed so as to have an increased hydroxyl group content is used, the crosslink density is improved and viscosity reduction (formation of high solid compound) and coating films hardness can both be attained simultaneously. From the luster viewpoint, the polyol (A1) is preferred owing to the ring structure thereof.

It was further found that when, in a curable coating composition comprising such a resin composition for coatings and a crosslinking agent, the crosslinking agent comprises a (blocked) polyisocyanate compound as an essential constituent, (1) the reactivity in the step of curing can be increased and coating films having a good appearance can be formed and, in addition, the pot life of the coating can sufficiently be maintained by using an organometallic compound and an acidic substance combinedly for promoting the curing of the composition and (2) the coating composition can be rendered quickly curable and can maintain a satisfactory pot life by using a temperature-sensitive catalyst showing catalytic activity at 60° C. or above and, further, a high level of appearance can also be produced since the curable coating composition is generally applied at room temperature, in this case its catalytic activity is shown, and the reaction between the hydroxyl and isocyanato groups will not proceed immediately after application, hence there is enough time for the leveling of the coating film.

Thus, the present invention provides a resin composition for coatings comprising a polyol (A1), a polyether polyol (B) and a solvent (C), wherein the weight ratio between said polyol (A1) and said polyether polyol (B) is 50/50 to 90/10, the weight ratio between the sum of said polyol (A1) and polyether polyol (B) and the solvent (C) is 40/60 to 90/10, and said polyol (A1) comprises the product of copolymerization of a polymerizable unsaturated monomer composition, said polymerizable unsaturated monomer composition comprising 5.0 to 80.0% by weight of a hydroxyl-containing polymerizable unsaturated monomer and 20.0 to 95.0% by weight of another polymerizable unsaturated monomer while having 10.0 to 100.0% by weight of a ring structure-containing polymerizable unsaturated monomer, per 100% by weight of said monomer composition.

The invention further provides a resin composition for coatings comprising a polyol (A2), a polyether polyol (B) and a solvent (C), wherein the weight ratio between said polyol (A2) and said polyether polyol (B) is 50/50 to 90/10, the weight ratio between the sum of said polyol (A2) and polyether polyol (B) and the solvent (C) is 40/60 to 90/10, and said polyol (A2) comprises the product of copolymerization of a polymerizable unsaturated monomer composition, said polymerizable unsaturated monomer composition comprising 20.0 to 75.0% by weight of a hydroxyl-containing polymerizable unsaturated monomer, 25.0 to 80.0% by weight of another polymerizable unsaturated monomer while having 25.0 to 80.0% by weight of a linear branched structure-containing polymerizable unsaturated monomer, per 100% by weight of said monomer composition, said linear branched structure-containing polymerizable unsaturated monomer having an SP value of not more than 9.5 and capable of giving a homopolymer with a glass transition point (Tg) not lower than 60° C.

The invention still further provides a curable coating composition which comprises the above resin composition for coatings and a crosslinking agent.

In the following, the invention is described in detail.

The resin composition for coatings according to the invention includes two modes of embodiment, the one comprising polyol (A1), polyether polyol (B) and solvent (C) and the other comprising polyol (A2), polyether polyol (B) and solvent (C) Thus, it comprises the polyol (A1) or polyol (A2) together with the polyether polyol (B) and solvent (C). Each constituent element in these resin compositions for coatings according to the invention may comprise one single species or a combination of two or more species. The polyol (A1) and polyol (A2) may be used in combination.

Owing to the use of a specific polyol (A1) resulting from polymerization of a ring structure-containing monomer, the coating films formed by the above resin composition for coatings have high hardness and high luster and further, when ring structure is a cylcloalkyl structure, good weathering resistance. The same effects as mentioned above can also be produced by using a specific polyol (A2) resulting from polymerization of a linear branched structure-containing monomer although the effects may be inferior as compared with those obtainable by using the polyol (A1). Flexibility can be obtained by using the polyether polyol (B) in a specific proportion relative to the polyol (A1) or polyol (A2). Owing to the synergistic effects of such polyol (A1) having a specific ring structure or such polyol (A2) having a specific linear branched structure and the polyether polyol (B) used in a specific proportion relative to the polyol (A1) or polyol (A2), cured coating films having high luster and good weathering resistance can be formed and the coating films can have both hardness and flexibility simultaneously in spite of the fact that the hardness and flexibility of coating films are properties inconsistent with each other. In the case of resin compositions for coatings, it is a general practice in the art to use a diluent such as a solvent to reduce the viscosity of the resin compositions and thereby make them easy to handle. On the contrary, the polyether polyol (B) in the resin composition for coatings can serve as a diluent for the polyol (A1) or polyol (A2), hence the content of the solvent (C) can be reduced and this facilitates the handling of the composition. Therefore, the solvent content can be reduced without impairing the workability of the resin composition for coatings or the applicability of the curable coating composition prepared therefrom; in other words, the so-called high solid compositions can be prepared. From the high solid viewpoint, the use of the polyol (A2) is preferred.

In the resin composition for coatings according to the invention, the weight ratio between the polyol (A1) or polyol (A2) and the polyether polyol (B) is 50/50 to 90/10. If the weight proportion of the polyol (A1) or polyol (A2) is smaller than 50/50, the coating films will have a low hardness and, when the weight proportion of the polyol (A1) or polyol (A2) is higher than 90/10, the resin composition for coatings will have a high viscosity, hence become difficult to use as a coating composition and, in addition, the resulting coating films will become hard and fragile. A more preferred weight ratio range is 60/40 to 80/20.

In the resin composition for coatings according to the invention, the weight ratio between the sum of the polyol (A1) or polyol (A2) and the polyether polyol (B) and the solvent (C) is 40/60 to 90/10. If the weight proportion of the polyol (A1) or polyol (A2) and the polyether polyol (B) is less than 40/60, the coating composition which is prepared using the resin composition for coatings will become difficult to handle since the addition amount of a thinner for use in diluting the resin composition for coatings to prepare the coating composition is restricted; the degree of freeness in formulating coatings decreases and it becomes difficult to prepare high solid coating compositions. When the weight proportion of the polyol (A1) or polyol (A2) and the polyether polyol (B) is greater than 90/10, the resin composition for coatings becomes highly viscous, hence difficult to handle. The weight ratio is preferably 50/50 to 90/10, more preferably 60/40 to 90/10. The terms "polyol (A1) or polyol (A2) and polyether polyol (B)" used hereinabove respectively mean polymers.

The polyol (A1) comprises the product of copolymerization of a polymerizable unsaturated monomer composition which comprises 5.0 to 80.0% by weight of a hydroxyl-containing polymerizable unsaturated monomer and 20.0 to 95.0% by weight of another polymerizable unsaturated monomer, and the polymerizable unsaturated monomer composition comprises 10.0 to 100.0% by weight, per 100% by weight of the monomer composition, of a ring structure-containing polymerizable unsaturated monomer.

The polyol (A2) comprises the product of copolymerization of a polymerizable unsaturated monomer composition which comprises 20.0 to 75.0% by weight of a hydroxyl-containing polymerizable unsaturated monomer and 25.0 to 80.0% by weight of another polymerizable unsaturated monomer, and the polymerizable unsaturated monomer composition comprises 25.0 to 80.0% by weight, per 100% by weight of the monomer composition, of a linear branched structure-containing polymerizable unsaturated monomer having an SP value of not more than 9.5 and capable of giving a homopolymer having a glass transition point (Tg) not lower than 60° C. In the present specification, the "linear branched structure-containing polymerizable unsaturated monomer having an SP value of not more than 9.5 and capable of giving a homopolymer having a glass transition point (Tg) not lower than 60° C." is referred to also as "linear branched structure-containing polymerizable unsaturated monomer".

Those polymerizable unsaturated monomers each may comprise a single species or a combination of two or more species. The total copolymerization proportion of the hydroxyl-containing polymerizable unsaturated monomer and the other polymerizable unsaturated monomer is 100%, and accounts for the whole polymerizable unsaturated monomer composition which is to form the polyol (A1) or polyol (A2). The copolymerization proportion of the ring structure-containing polymerizable unsaturated monomer means the copolymerization proportion which is based on the whole polymerizable unsaturated monomer composition to form the polyol (A1), and the copolymerization proportion of the linear branched structure-containing polymerizable unsaturated monomer means the copolymerization proportion which is based on the whole polymerizable unsaturated monomer composition to form the polyol (A2). While the ring structure-containing polymerizable unsaturated monomer may have or be free of a linear branched structure, the linear branched structure-containing polymerizable unsaturated monomer has no ring structure. Thus, in the present specification, a ring structure-containing polymerizable unsaturated monomer and a linear branched structure is involved under the category of ring structure-containing polymerizable unsaturated monomers.

The hydroxyl-containing polymerizable unsaturated monomer mentioned above may comprise a a hydroxyl- and ring structure-containing polymerizable unsaturated monomer. The other polymerizable unsaturated monomer may comprise or be free of a ring structure-containing polymerizable unsaturated monomer. The combination of these polymerizable unsaturated monomers is not particularly restricted provided that the above-specified conditions are satisfied. In cases that a hydroxyl- and ring structure-containing polymerizable unsaturated monomer is contained, the copolymerization proportion of that polymerizable unsaturated monomer is to be included in each of the copolymerization proportions of the hydroxyl-containing polymerizable unsaturated monomer and the ring structure-containing polymerizable unsaturated monomer.

The hydroxyl-containing polymerizable unsaturated monomer is a polymerizable unsaturated monomer having at least one hydroxyl group within the molecule.

The hydroxyl group can be involved in crosslinking, by means of a crosslinking agent, of the polyol (A1) or polyol (A2). resulting from copolymerization of the respective polymerizable unsaturated monomer composition.

By copolymerizing the above hydroxyl-containing polymerizable unsaturated monomer, it becomes possible to crosslink the polyol (A1) or polyol (A2) by means of a crosslinking agent and thus it becomes possible to improve the basic properties, such as luster, feel of thickness and solvent resistance, and the weathering resistance of the coating films formed from the resin composition for coatings.

The above-mentioned hydroxyl-containing polymerizable unsaturated monomer is not particularly restricted but includes, among others, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl acrylate (trademark: 4HBA, product of Mitsubishi Chemical), 4-hydroxybutyl methacrylate, α-hydroxymethylethyl acrylate, α-hydroxymethyl acrylate, caprolactone-modified hydroxy (meth)acrylates (trademark: Placcel F series, products of Daicel Chemical Industries), 4-methylolcyclohexylmethyl acrylate (trademark: CHDMMA, product of Nippon Kasei) and the like.

If the copolymerization proportion of the hydroxyl-containing polymerizable unsaturated monomer is smaller than the weight proportion specified hereinabove, it is impossible, when the polyol (A1) is used, to attain a sufficient degree of crosslinking using a crosslinking agent, hence the coating films formed from the resulting resin composition for coatings cannot be provided with solvent resistance and, when the polyol (A2) is used, the coating films will be inferior in hardness. When the weight ratio range given above is exceeded, the polyol (A1) or polyol (A2) acquires an excessively high viscosity and this impairs the workability of the resulting resin composition for coatings. When the polyol (A1) is used, the above proportion is more preferably 10.0 to 70.0% by weight, still more preferably 25.0 to 60.0% by weight and, when the polyol (A2) is used, it is more preferably 30.0 to 50.0% by weight.

The polyol (A1) is formed by using a ring structure-containing polymerizable unsaturated monomer as an essential constituent. By using such polymerizable unsaturated monomer, it becomes possible to improve the basic properties, such as hardness, luster and feel of thickness, of the coating films formed from the resulting resin composition for coatings. In this case, a marked effect is produced on the luster, in particular.

The ring structure-containing polymerizable unsaturated monomer may be any polymerizable unsaturated monomer having at least one ring structure within the molecule. The species and number of ring-constituting atoms are not particularly restricted. Thus, for example, carbon, nitrogen, oxygen and sulfur atoms, among others, may be mentioned as the ring-constituting atoms, and the number of such atoms may be 3 to 10, for instance. Those polymerizable unsaturated monomers having a 5- to 8-membered ring structure constituted mainly of carbon atoms and optionally containing a nitrogen atom or atoms, for instance, are preferably used among others. In view of the luster, feel of thickness and weathering resistance, an alicyclic structure is preferred. The ring structure may have or be free of a functional group. Such a polymerizable unsaturated monomer may have the ring structure in the main chain, on a side chain and/or at a terminus thereof. Further, the ring structure, when it occurs at a crosslinking site for crosslinking of the polyol (A1), can contribute to improvements in hardness of coating films. The ring structure-containing polymerizable unsaturated monomer may comprise one single species or a combination of two or more species.

The above-mentioned ring structure-containing polymerizable unsaturated monomer includes, among others, those mentioned below under (1) to (7) by chemical name and/or trademark.

(1) Ring structure-containing (meth)acrylate esters: cyclohexyl methacrylate (trademark: Light Ester CH, product of Kyoeisha Chemical), cyclohexyl acrylate, tert-butylcyclohexyl (meth)acrylate, cyclooctyl (meth)acrylate, cyclododecyl (meth)acrylate, tetrahydrofurfuryl methacrylate (Light Ester THF, Kyoeisha Chemical), tetrahydrofurfuryl acrylate (trademark: Light Acrylate THF-A, product of Kyoeisha Chemical), benzyl methacrylate (Light Ester BZ, Kyoeisha Chemical), phenoxyethyl methacrylate (Light Ester PO, Kyoeisha Chemical), phenoxyethyl acrylate (Light Acrylate PO-A, Kyoeisha Chemical), isobornyl methacrylate (Light Ester IB-X, Kyoeisha Chemical), isobornyl acrylate (trademark: FA-544A, product of Hitachi Chemical; trademark: Light Acrylate IB-XA, product of Kyoeisha Chemical), dicyclopentanyl methacrylate (FA-513M, Hitachi Chemical), dicyclopentanyl acrylate (FA-513A, Hitachi Chemical), dicyclopentenyl acrylate (FA-511A, Hitachi Chemical), dicyclopentenyloxyethyl methacrylate (FA-512M and FA-512MT, Hitachi Chemical), dicyclopentenyloxyethyl acrylate (FA-512A, Hitachi Chemical), morpholine acrylate, tribromophenyl methacrylate, 4-methylcyclohexylmethyl (meth)acrylate, cyclohexylmethyl (meth) acrylate, etc.

Preferred among the compounds listed under (1) are (meth)acrylate esters having a cycloalkyl structure.

(2) Epoxy group-containing (meth)acrylate esters: glycidyl (meth)acrylate, α-methylglycidyl acrylate, 3,4-epoxycyclohexylmethyl acrylate (trademark: CYCLOMER A 200, product of Daicel Chemical Industries), α-methylglycidyl methacrylate (trademark: M-GMA, product of Daicel Chemical Industries), 3,4-epoxycyclohexylmethyl methacrylate (CYCLOMER M 100, Daicel Chemical Industries), etc.

(3) Ultraviolet-absorbing (meth)acrylate esters: 2-[2'-hydroxy-5'-(meth)acryloyloxyethylphenyl]-2'H-benzotriazole, 2-[2'-hydroxy-5'-(meth)acryloyloxypropylphenyl]-2H-benzotriazole, 2-[2'-hydroxy-5'-(meth) acryloyloxyhexylphenyl]-2H-benzotriazole, 2-[2'-hydroxy-3'-tert-butyl-5'-(meth)acryloyloxyethylphenyl]-2H-benzotriazole, 2-[2'-hydroxy-3'-tert-butyl-5'-(meth)acryloyloxyethylphenyl]-5-chloro-2H-benzotriazole, 2-[2'-hydroxy-5'-tert-butyl-3'-(meth)acryloyloxyethylphenyl]-2H-benzotriazole, 2-[2'-hydoxy-5'-(meth) acryloyloxyethylphenyl]-5-chloro-2H-benzotriazole, 2-[2'-hydroxy-5'-(meth)acryloyloxyethylphenyl]-5-methoxy-2H-benzotriazole, 2-[2-hydroxy-5'-(meth)acryloyloxy-ethylphenyl]-5-cyano-2H-benzotriazole, 2-[2'-hydroxy-5'-(meth)acryloyloxyethylphenyl]-5-tert-butyl-2H-benzotriazole, 2-[2'-hydroxy-5'-(β-methacryloyloxyethoxy)-3'-tert -butylphenyl]-4-tert-butyl-2H-benzotriazole, etc. As a commercial product, there maybe mentioned RUVA-93 (trademark, product of Otsuka Chemical), for instance.

Mention may also be made of 2-hydroxy-4-methacryloxy-benzophenone, 2-hydroxy-4-(2-hydroxy-3-methacryloyloxy)propoxybenzophenone, 2-hydroxy-4-(2-methacryloxy)ethoxybenzophenone, 2-hydroxy-4-vinyloxycarbonylmethoxybenzophenone and the like. Preferred among them are 2-hydroxy-4-methacryloxybenzophenone and 2-hydroxy-4-(2-methacryloxy)ethoxybenzophenone.

(4) Piperidine skeleton-containing (meth)acrylate esters: 4-(meth)acryloyloxy-2,2,6,6-tetramethylpiperidine, 4-(meth)acryloyloxy-1,2,2,6,6-pentamethylpiperidine, 4-(meth)acryloylamino-2,2,6,6-tetramethylpiperidine, 4-(meth)acryloylamino-1,2,2,6,6-pentamethylpiperidine, 4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 1-crotonoyl-4-crotonoyloxy-2,2,6,6-tetramethylpiperidine and the like.

As commercial products, there may be mentioned reactive hindered amine light stabilizers (reactive HALSs), such as Adekastab LA-82 and Adekastab LA-87 (trademarks, products of, Asahi Denka Kogyo), FA-711MM and FA-712HM (trademarks, products of Hitachi Chemical) and so forth.

(5) Polyfunctional polymerizable (meth)acrylate esters: 2,2-bis[4-(methacryloxyethoxy)phenyl]propane diacrylate, 2,2-bis[4-(methacryloxydiethoxy)phenyl]propane diacrylate, 2,2-bis [4-(methacryloxypolyethoxy) phenyl]propane diacrylate, EO-modified bisphenol A diacrylate, PO-modified bisphenol A diacrylate, 2,2-bis[4-(methacryloxydiethoxy)phenyl]propane dimethacrylate and the like.

(6) Others: vinyl esters such as vinyl cyclohexanecarboxylate and vinyl benzoate; nitrogen-containing polymerizable unsaturated monomers such as N-vinylpyrrolidone, N-vinyloxazolidone, N-phenylmaleimide, N-cyclohexylmaleimide, 2-isopropenyl-2-oxazoline, N-vinylpyridine, N-vinylimidazole, N-vinylpyrrole and N-vinylsuccinimide; vinyl ethers such as benzyl vinyl ether and phenyl vinyl ether; aromatic vinyl monomers such as styrene, α-methylstyrene and vinyltoluene; macromer compounds such as AS-6 and AN-6 (trademarks, products of Toagosei Chemical Industry), maleic anhydride, m-isopropenyl-α, α-dimethylbenzyl isocyanate (trademark: m-TMI, product of Takeda Chemical Industries) and so on.

A polymerizable unsaturated monomer containing at least one ring structure and selected from among those mentioned above under (1), (3) and (4) is preferably used as said ring structure-containing polymerizable unsaturated monomer.

When the copolymerization proportion of the ring structure-containing polymerizable unsaturated monomer is less than 10.0% by weight, the hardness and luster of the coating films obtained from the resin composition for coatings according to the invention cannot be improved to a satisfactory extent. The proportion is more preferably 20.0 to 100% by weight, still more preferably 30.0 to 100% by weight.

In the present invention, the polymerizable unsaturated monomer composition to form the polyol (A1) preferably comprises a cycloalkyl structure-containing polymerizable unsaturated monomer. The cycloalkyl structure-containing polymerizable unsaturated monomer mentioned above has at least one cycloalkyl structure within the molecule. Such polymerizable unsaturated monomer may have the cycloalkyl structure in the main chain, on a side chain and/or at a terminus thereof. The cycloalkyl structure introduced into the copolymer through such a polymerizable unsaturated monomer can suppress the degradation of the resin and improve the weathering resistance of the coating films. It can also improve such performance characteristics of the coating films as hardness, luster, feel of thickness and solvent resistance; it can markedly improve the weathering resistance. Furthermore, the above cycloalkyl structure-containing polymerizable unsaturated monomer is preferably used in combination with a polymerizable unsaturated monomer having an ultraviolet stabilizer group. For example, the combined use of 0.1 to 10.0% by weight, preferably 0.2 to 5.0% by weight, more preferably 0.3 to 3.0% by weight, of such a reactive hindered amine light stabilizer (HALS) as mentioned above or the like can result in further improvements in weathering resistance.

In the present specification, the weathering resistance means the durability of the coating films upon outdoor exposure. The weathering resistance can be evaluated, for example in terms of luster retention, discoloration resistance, water resistance, cracking resistance, blistering resistance, etc.

The above cycloalkyl structure-containing polymerizable unsaturated monomer is not particularly restricted but preferably is, for example, a polymerizable unsaturated monomer represented by the following general formula (1):

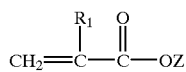

(1)

In the above formula, $R^1$ represents a hydrogen atom or a hydrocarbon group containing 1 or 2 carbon atoms; and Z is an ester group having a cycloalkyl structure containing 3 to 36 carbon atoms which may optionally be substituted. The substituent on the cycloalkyl structure optionally having a substituent is not particularly restricted but may be, for example a hydrocarbon group containing 1 to 18 carbon atoms.

The above-mentioned hydrocarbon group containing 1 or 2 carbon atoms is not particularly restricted but may be, for example, a methyl or ethyl group.

The cycloalkyl structure in the cycloalkyl structure optionally having a substituent is not particularly restricted but includes, among others, the cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl and like structures.

The polymerizable unsaturated monomer represented by the above general formula (1) is not particularly restricted but includes, among others, cyclohexyl (meth)acrylate, methylcyclohexyl (meth)acrylate, tert-butylcyclohexyl (meth)acrylate, cyclooctyl (meth)acrylate, cyclododecyl (meth)acrylate, isobornyl methacrylate (trademark: Light Ester IB-X, product of Kyoeisha Chemical), isobornyl acrylate (trademark: FA-544A, product of Hitachi Chemical; trademark: Light Acrylate IB-XA, product of Kyoeisha Chemical), dicyclopentanyl methacrylate (trademark: FA-513M, product of Hitachi Chemical), dicyclopentanyl acrylate (trademark: FA-513A, product of Hitachi Chemical), 4-methylolcyclohexylmethyl acrylate (trademark: CHDMMA, product of Nippon Kasei), 4-methylcyclohexylmethyl (meth)acrylate, cyclohexylmethyl (meth)acrylate and the like. The cycloalkyl structure-containing polymerizable unsaturated monomer mentioned above may be used singly or two or more of them may be used in combination.

The copolymerization proportion of the above cycloalkyl structure-containing polymerizable unsaturated monomer is not particularly restricted but is preferably 10.0 to 100.0% by weight, for instance. When it is smaller than 10.0% by weight, the hardness, luster, feel of thickness and like basic properties of the coating films may not be improved. Further, the ability of the polyol (A1) to cause formation of coating films having very high weathering resistance may be lost. A more preferred proportion is 20.0 to 100.0% by weight.

As regards the polyol (A1), the polymerizable unsaturated monomer may have two or more structures selected from the group consisting of the above-mentioned hydroxyl group, ring structure and cycloalkyl structure. In cases that such a polymerizable unsaturated monomer is contained, the copolymerization proportion of the polymerizable unsaturated monomer is included in each of the copolymerization proportion of the hydroxyl-containing polymerizable unsaturated monomer, that of the ring structure-containing polymerizable unsaturated monomer and that of the cycloalkyl structure-containing polymerizable unsaturated monomer.

The polymerizable unsaturated monomer other than those mentioned above which is to be used in forming the polyol (A1) is not particularly restricted but includes, among others, those listed below under (1) to (10) These may be used singly or two or more of them may be used in combination.

(1) (Meth)acrylate esters: methyl (meth)acrylate, ethyl (meth)acrylate, n-butyl (meth)acrylate, iso-butyl (meth)acrylate, tert-butyl (meth)acrylate, sec-butyl (meth)acrylate, n-propyl (meth)acrylate, iso-propyl (meth)acrylate, iso-amyl (meth)acrylate, 2-ethylhexyl (meth)acrylate, iso-decyl (meth)acrylate, tridecyl (meth)acrylate, n-octyl (meth)acrylate, iso-octyl (meth)acrylate, n-lauryl (meth)acrylate, n-stearyl (meth)acrylate, iso-stearyl (meth)acrylate, 2-acetoacetoxyethyl acrylate, 2-acetoacetoxyethyl methacrylate (trademark: AAEM, product of East) and the like.

(2) Acidic functional group-containing polymerizable unsaturated monomers: (meth)acrylic acid, maleic acid, fumaric acid, crotonic acid, itaconic acid, carboxyl terminal caprolactone-modified acrylates, carboxyl terminal caprolactone-modified methacrylates (trademark: Placcel FMA series, products of Daicel Chemical Industries) and like carboxyl-containing polymerizable unsaturated monomers; sulfoethyl (meth)acrylate, 2-(meth) acryloyloxyethyl acid phosphate, 2-(meth) acryloyloxypropyl acid phosphate and like polymerizable unsaturated acidic phosphate ester monomers, and so forth.

(3) Vinyl esters: vinyl acetate, vinyl butyrate, vinyl caproate, vinyl caprylate, vinyl caprate, vinyl laurate, vinyl myristate, vinyl palmitate, vinyl stearate, vinyl pivalate, vinyl octylate, vinyl monochloroacetate, divinyl adipate, vinyl methacrylate, vinyl crotonate, vinyl sorbate, vinyl cinnamate, etc.

(4) Silicon atom-containing polymerizable unsaturated monomers: vinyltrichlorosilane, vinyltris (β-methoxyethoxy)silane, vinyltriethoxysilane, vinyltrimethoxysilane, γ-methacryloxypropyltrimethoxysilane, trimethylsiloxyethyl methacrylate, etc.

(5) Halogen atom-containing polymerizable unsaturated monomers: trifluoroethyl (meth)acrylate, tetrafluoropropyl (meth)acrylate, octafluoropentyl (meth)acrylate, heptadodecafluorodecyl (meth)acrylate, β-(perfluorooctyl) ethyl (meth)acrylate, hexafluoropropyl methacrylate, tribromophenol-3 EO adduct methacrylate, perfluorooctylethyl (meth)acrylate, etc.

(6) Nitrogen atom-containing polymerizable unsaturated monomers: (meth)acrylamide, N,N-dimethylaminopropylacrylamide, N-isopropylacrylamide, tert-butylacrylamide, methylenebis(meth)acrylamide, N-methoxymethylacrylamide, N-ethoxymethylacrylamide, N-butoxymethylacrylamide, N-methylol(meth)acrylamide, N,N'-dimethylaminoethyl(meth)acrylate, N,N'-diethylaminoethyl (meth)acrylate, N-methyl-N-vinylformamide, methacryloyloxyethyltrimethylammonium chloride, dimethylaminoethyl methacrylate sulfate, morpholine-EO adduct methacrylate, N-vinylmethylcarbamate, N,N-methylvinylacetamide, imido (meth)acrylate, quaternization products derived from dimethylaminoethyl (meth)acrylate, diacetoneacrylamide, etc.

(7) Polyfunctional polymerizable unsaturated monomers: ethylene glycol di(meth)acrylate, diethylene glycol di(meth)acrylate, triethylene glycol diacrylate, polyethylene glycol #200 di(meth)acrylate, polyethylene glycol #400 di (meth)acrylate, polyethylene glycol #600 di (meth)acrylate, polyethylene glycol #1000 diacrylate, 1,3-butylene glycol diacrylate, 1,4-butanediol di(meth) acrylate, 1,6-hexanediol di(meth)acrylate, 1,9-nonanediol diacrylate, neopentyl glycol di(meth)acrylate, polypropylene glycol #400 di(meth)acrylate, EO-modified trimethylolpropane triacrylate, pentaerythritol triacrylate, pentaerythritol tetraacrylate, dipentaerythritol hexaacrylate, trisacryloyloxyethyl phosphate, glycerol dimethacrylate, 2-hydroxy-1,3-dimethacryloxypropane diacrylate, trimethylolpropane tri(meth)acrylate, etc. The polyethylene glycol #200 di(meth)acrylate, polyethylene glycol #400 di(meth)acrylate, polyethylene glycol #600 di(meth) acrylate and polyethylene glycol #1000 diacrylate are (meth)acrylic acid esters of polyethylene glycol with a polymerization degree of 200, polyethylene glycol with a polymerization degree of 400, polyethylene glycol with a polymerization degree of 600 and polyethylene glycol with a polymerization degree of 1000, or polypropylene glycol with a polymerization degree of 400, respectively.

(8) Vinyl ethers: vinyl methyl ether, vinyl ethyl ether, vinyl isopropyl ether, vinyl n-propyl ether, vinyl isobutyl ether, vinyl n-butyl ether, vinyl n-amyl ether, vinyl isoamyl ether, vinyl 2-ethylhexyl ether, vinyl n-octadecyl ether, cyanomethyl vinyl ether, 2,2-dimethylaminoethyl vinyl ether, 2-chloroethyl vinyl ether, β-difluoro-methyl vinyl ether, divinyl ether, divinylacetal, etc.

(9) Isocyanato (NCO) group-containing polymerizable unsaturated monomers: 2-methacryloyloxyethyl isocyanate (trademark: Karenzu MOI, Product of Showa Denko), methacryloyl isocyanate (trademark: MAI, product of Nippon Paint), etc.

(10) Vinyl chloride, vinylidene chloride, AA-6 (macromer; trademark, product of Toagosei Chemical), etc.

The copolymerization proportion of the polymerizable unsaturated monomer such as one among those listed above under (1) to (10) is not particularly restricted provided that it is within the range of 0.0 to 90.0% by weight of the polymerizable unsaturated monomer composition (100% by weight) forming the polyol (A1). That proportion canbe selected according to need.

The above-mentioned polyol (A2) is formed by using, as an essential constituent, a linear branched structure-containing polymerizable unsaturated monomer. By using said polymerizable unsaturated monomer, it becomes possible for the resulting resin composition for coatings to provide the coating films formed therefrom with improved basic performance characteristics, such as hardness, luster and feel of thickness. In this case, good effects can be produced in particular in preparing high solid compositions.

The linear branched structure-containing polymerizable unsaturated monomer may be any polymerizable unsaturated monomer having at least one linear branched structure within the molecule and an SP value of not more than 9.5 and capable of giving a homopolymer having a glass transition point (Tg) of not lower than 60° C. The species and number of atoms constituting the linear branched structure are not particularly restricted. Thus, for example, carbon, nitrogen, oxygen and sulfur atoms, among others, may be mentioned as the linear branched structure-constituting atoms, and the number of such atoms may be 3 to 10, for instance. Those polymerizable unsaturated monomers constituted mainly of carbon atoms are preferably used among others. The linear branched structure may have or be free of a functional group. Such a polymerizable unsaturated monomer may have the linear branched structure in the main chain, on a side chain and/or at a terminus thereof. Further, the linear branched structure, when occurring at a site of crosslinking on the occasion of crosslinking of the polyol (A2), can contribute to improvements in hardness of coating films. The linear branched structure-containing polymerizable unsaturated monomers may be used singly or two or more of them may be used in combination.

In a preferred embodiment, the SP value which the linear branched structure-containing polymerizable unsaturated monomer has is not more than 9.3, more preferably not more than 9.1. In apreferred embodiment, the glass transition point (Tg) of the homopolymer is not lower than 100° C. The SP values as described herein are calculated from the formula in "Journal of Coating Technology" (Vol. 55, No. 696, January (1983), published in England, p.99–109).

As specific examples of the above-mentioned linear branched structure-containing polymerizable unsaturated monomer, there may be mentioned, by chemical name, tert-butyl methacrylate, iso-butyl methacrylate, sec-butyl methacrylate and the like. Among these, tert-butyl methacrylate is preferred.

If the copolymerization proportion of the linear branched structure-containing polymerizable unsaturated monomer is less than 25.0% by weight, the high solid content resin composition for coatings according to the invention cannot be prepared any longer. If it exceeds 80.0%, the copolymerization proportion of the hydroxyl-containing polymerizable unsaturated monomer necessary for providing coating films with hardness becomes low, hence the hardness of coating films will decrease. A preferred range is 30.0 to 60.0% by weight.

In the case of polyol (A2), the polymerizable unsaturated monomer may have the above-mentioned hydroxyl group and linear branched structure. In cases that such polymerizable unsaturated monomer is contained, the copolymerization proportion of that polymerizable unsaturated monomer is included in each of the copolymerization proportion of the hydroxyl-containing polymerizable unsaturated monomer and that of the linear branched structure-containing polymerizable unsaturated monomer.

The polymerizable unsaturated monomer other than those mentioned above to be used in forming the polyol (A2) is not particularly restricted but includes, among others, those specifically listed hereinabove under (1) to (10) referring to the polyol (A1). These may be used singly or two or more of them may be used in combination. Since, however, linear branched structure-containing polymerizable unsaturated monomer are included among those listed above under (1) to (10), the polymerizable unsaturated monomer other than those mentioned above to be used in forming the polyol (A2) is to be selected from among the ones other than those monomers.

Referring to the polyol (A2), the copolymerization proportion of the polymerizable unsaturated monomer such as one of those listed above under (1) to (10) (excluding those linear branched structure-containing polymerizable unsaturated monomers) is not particularly restricted provided that it is within the range of 0 to 55.0% by weight relative to the polymerizable unsaturated monomer composition (100% by weight) to form the polyol (A2). The monomer is thus used according to need.

In the practice of the invention, the polyol (A1) or polyol (A2) is preferably a (meth)acrylic polymer. By this, the polyol can have an increased level of weathering resistance. More preferably, the corresponding (meth)acrylic polymerizable unsaturated monomer amounts to not less than 80% by weight. The term "(meth)acrylic polymer" means a polymer formed from polymerizable unsaturated monomer compositions comprising not less than 50% by weight of (meth)acrylic polymerizable unsaturated monomers. The term "(meth)acrylic polymerizable unsaturated monomers" means both (meth)acrylate acid and (meth)acrylate ester.

The polyol (A1) or polyol (A2) preferably has a hydroxyl value of 30 to 300 mg KOH/g. When the value is less than 30 mg KOH/g, the crosslink density obtained by polyol crosslinking is insufficient, hence the resulting resin composition for coatings may possibly fail to form coating films balanced between hardness and flexibility. If it exceeds 300 mg KOH/g, the viscosity of the polyol increases, hence the workability of the resin composition for coatings may possibly deteriorate. A more preferred range is 60 to 200 mg KOH/g.

Furthermore, the polyol (A1) or polyol (A2) preferably has a number average molecular weight of 1,000 to 15,000. If this is less than 1,000, the curing thereof may possibly proceed only to an insufficient extent in the step of curing. When it exceeds 15,000, the polyol viscosity increases, the viscosity of the resulting resin composition for coatings increases accordingly, hence the workability may possibly deteriorate. A more preferred range is 1,300 to 10,000 and a still more preferred range is 1,500 to 7,000.

In synthesizing the polyol (A1) or polyol (A2), the method of copolymerization of the above-mentioned polymerizable unsaturated monomer composition is not particularly restricted but, for example, the technique utilizing a chain polymerization reaction such as radical polymerization, anionic polymerization, cationic polymerization and coordination polymerization; the technique utilizing sequence reaction such as addition condensation, polycondensation, elimination condensation polymerization, addition polymerization or the technique utilizing a ring opening reaction such as ring opening polymerization can be applied.

The above copolymerization is not particularly restricted in mode of practice but may be carried out, for example, in the manner of ordinary bulk polymerization, solution polymerization or the like under appropriately selected polymerization conditions. The use or nonuse of an additive such as a polymerization initiator, chain transfer agent, polymerization inhibitor, photopolymerization catalyst and/or reducing agent, and/or a solvent as well as the amounts thereof can appropriately be selected. Each of the additives and solvent may comprise one single species or a combination of two or more species.

The above-mentioned polymerization initiator is not particularly restricted but includes, among others, azo-containing initiators such as 2,2'-azobis(2-methylbutyronitrile) (trademark: ABN-E, product of Nippon Hydrazine Kogyo), 2,2'-azobisisobutyronitrile (trademark: AIBN, product of Nippon Hydrazine Kogyo) and 2,2'-azobis(2,4-dimethylvaleronitrile) (trademark: ABN-V, product of Nippon Hydrazine Kogyo); peroxide initiators such as benzoyl peroxide (trademark: Nyper BW, product of NOF Corp.), 1,1-bis(tert-butylperoxy)-3,3,5-trimethylcyclohexane (trademark: Perhexa 3M, product of NOF) and tert-butyl perpoxy-2-ethylhexanoate (trademark: Perbutyl O, product of NOF), and so forth. The addition amount of such a polymerization initiator is not particularly restricted but preferably is, for example, 0.05 to 25% by weight, more preferably 1.0 to 20% by weight, still more preferably 3.0 to 15% by weight, based on the total weight of the polymerizable unsaturated monomer composition.

The above-mentioned chain transfer agent is not particularly restricted but includes, among others, alkyl mercaptans such as n-butyl mercaptan, n-hexyl mercaptan, n-octyl mercaptan, n-dodecyl mercaptan, tert-dodecyl mercaptan, cetyl mercaptan and stearyl mercaptan; other mercaptans such as thioglycolic acid, thioglycerol, ethylene thioglycol, 2-ethylhexyl thioglycolate, 2-mercaptoethanol, mercaptoglycerol, mercaptosuccinic acid and mercaptopropionic acid; halides such as carbon tetrachloride, chloroform, trichlorobromoethane and bromoform; disulfides, dimethylxanthogen disulfide, sec-alcohols, isopropyl alcohol, dioxane, tetrahydrofuran, isopropylbenzene, α-methylstyrene dimer, 2,4-diphenyl-4-methyl-1-pentene, γ-mercaptopropyltrimethoxysilane, etc. The use amount of such chain transfer agents is not particularly restricted but is preferably, for example, 0.1 to 10% by weight relative to the total amount of the polymerizable unsaturated monomer composition.

The above-mentioned photopolymerization initiator is not particularly restricted but includes, among others, acetophenone compounds, benzoin ether compounds, benzophenone compounds, thioxanthone compounds and so forth. The addition amount of such a photopolymerization initiator is not particularly restricted but is preferably, for example, 0.1 to 30% by weight, more preferably 1 to 5% by weight, relative to the total amount of the polymerizable unsaturated monomer composition.

The reaction solvent to be used in the above copolymerization is not particularly restricted but includes, among others, the organic solvents listed below under (1) to (6).

(1) Hydrocarbon solvents: toluene, xylene, methylcyclohexane, ethylcyclohexane, Swasol 1000 (trademark: Maruzen Petrochemical), Swasol 1500 (trademark, product of Maruzen Petrochemical), mineral Spirit (trademark: Pegasol AN-45, product of Mobil Oil), HAWS, LAWS (trademark: product of Shell corp.) etc.

(2) Ester solvents: ethyl acetate, n-propyl acetate, n-butyl acetate, isobutyl acetate, n-amyl acetate, ethylene glycol ethyl ether acetate (cellosolve acetate), propylene glycol monomethyl ether acetate (trademark: Arcosolv PMA, product of Kuraray), tert-butyl acetate, etc.

(3) Ketone solvents: acetone, methyl ethyl ketone, methyl isobutyl ketone, cyclohexanone, methyl n-amyl ketone, etc.

(4) Alcohol solvents: methanol, ethanol, n-propyl alcohol, isopropyl alcohol, n-butyl alcohol, cyclohexanol, ethylene glycol, propylene glycol, propylene glycol monomethyl ether (trademark: PGM, product of Kuraray), propylene glycol monoethyl ether (trademark: PE, product of Kuraray), propylene glycol tert-butyl ether (trademark: PTB, product of Kuraray), 3-methyl-3-methoxybutanol (trademark: Solfit, product of Kuraray), dipropylene glycol monomethyl ether (trademark: D-PGM, product of Kuraray), etc.

(5) Ether solvents: ethylene glycol monomethyl ether (methylcellosolve), ethylene glycol monoethyl ether (ethylcellosolve), ethylene glycol monobutyl ether (butylcellosolve), diethylene glycol monoethyl ether (ethylcarbitol), diethylene glycol monobutyl ether (butylcarbitol), etc.

(6) Other solvents: tetrahydrofuran, N,N-dimethylformamide, dimethylacetamide, dioxane, chloroform, etc.

The polyether polyol (B) to be used in the practice of the invention is not particularly restricted but includes, among others, polyether polyols such as polyethylene glycol, polypropylene glycol, glycerol-propylene oxide adducts, glycerol-ethylene oxide adducts, trimethylolpropane-ethylene oxide adducts, trimethylolpropane propylene oxide adducts, bisphenol A-propylene oxide adducts, bisphenol A-ethylene oxide adducts, hydrogenated bisphenol A-propylene oxide adducts and hydrogenated bisphenol A-ethylene oxide adducts; alkanolamines such as ethanolamine, diethanolamine, triethanolamine, isopropanolamine, diisopropanolamine and triisopropanolamine; amine-derived polyethers obtainable by addition of ethylene oxide, propylene oxide or the like to amines such as ethylenediamine, aniline, tolylenediamine, N-aminoethylpiperazine, isophoronediamine, phenylenediamine, diaminodiphenylmethane and xylenediamine; and the like.

As commercial products usable as the polyether polyol (B), there maybe mentioned, for example, Adeka P series, BPX series, BEX series, G series, T series, EDP series, SP series, SC series and MG series polyethers (trademarks, products of Asahi Denka Kogyo) and the like. Among them, P series, G series, T series and EDP series ones are preferred.

Among the polyether polyol (B) species mentioned above, those having, on average, two to four hydroxyl groups within the molecule thereof and having a mean hydroxyl value of 30 to 600 mg KOH/g are preferred. When the mean number of hydroxyl groups within the molecule exceeds 5, the polyether polyol (B) has an excessively high viscosity and becomes a highly viscous liquid, paste or a solid, whereby the effect of reducing the viscosity of the resin composition for coatings decreases; it may possibly become difficult for the resulting resin composition for coatings to have a high solid content. When the mean hydroxyl value is less than 30 mg KOH/g, the molecular weight of the polyether polyol (B) exceeds 5,000 and the distance between two crosslinking sites becomes excessively long, hence the crosslink density of the polyether polyol (B) fraction becomes excessively low; the hardness of the resulting coating films may possibly become low. When the mean hydroxyl value exceeds 600 mg KOH/g, the polyether polyol (B) has an increased viscosity and becomes a highly viscous liquid, paste or a solid and, accordingly, it becomes difficult to reduce the viscosity of the resin composition for coatings, hence the workability may possible deteriorate. A more preferred range is 100 to 450 mg KOH/g.

The above polyether polyol (B) preferably has a number average molecular weight of not more than 5,000. When this exceeds 5,000, the viscosity may possibly increase. A value not more than 2,000 is more preferred.

The viscosity of the above polyether polyol (B) is not particularly restricted but, when the resin composition for coatings is used in preparing a high solid coating composition, for instance, it is preferably not more than 2,000 mPa·s. A viscosity exceeding 2,000 mPa·s causes the viscosity of the resin composition for coatings to increase and thus worsens the workability; it may possibly become difficult to use the resin composition in preparing high solid coating compositions.

In the practice of the invention, the polyol (hereinafter referred to as "polyol" for short) composed of the polyol (A1) or polyol (A2) and the polyether polyol (B) preferably has a hydroxyl value of 50 to 300 mg KOH/g. When this is less than 50 mg KOH/g, the crosslink density resulting from crosslinking is too low, hence the hardness of the resulting coating films may possibly become low. At above 300 mg KOH/g, the resin composition for coatings may possibly become a highly viscous liquid or paste and it becomes difficult to lower the viscosity, hence the workability may possibly become poor. A more preferred range is 90 to 300 mg KOH/g.

The solvent (C) to be used in the practice of the invention is not particularly restricted provided that it can dissolve the polyol (A1) or polyol (A2) and the polyether polyol (B) but mention may be made, for example, of the same solvents as the above-mentioned reaction solvents which are to be used in the polymerizationofthepolyol (A1) or polyol (A2). When ordinary temperature curing by isocyanate crosslinking is to be carried out with the curable coating composition, which is to be described more specifically later herein, the use of solvents other than alcohol type is preferred since alcohol solvents react with isocyanato groups.

The resin composition for coatings of the invention may contain other resins than the polyols unless the effects of the present invention are impaired.

The other resins are not particularly restricted but includes, among others, polystyrene, polyethylene, polypropylene, polyvinyl chloride, polyvinylidene chloride, polyurethanes, polymethyl methacrylate, polycarbonates, polyesters, polyamides, polybutadiene, polyvinyl alcohol resins, ABS (acrylonitrile-butadiene-styrene) resins, acetate resins, acrylic resins, fluororesins, epoxy resins, chlorinated polypropylene, alkyd resins, silicone resins, vinyl acetate resins, styrene-butadiene resins, polyester-modified acrylic resins and other modified resins, cellulose derivatives, vinyl chloride organosols, organosilicate condensates and the like. These may be used singly or two or more of them may be used in combination.

The method of preparing the resin composition for coatings according to the invention is not particularly restricted but mention may be made, for example, of the method of preparing resin compositions for coatings which comprises polymerizing the polyol (A1) or polyol (A2) and blending the resulting polymer with the polyether polyol (B) and solvent (C); and the method of preparing resin compositions for coatings which comprises producing the polyol (A1) or polyol (A2) by polymerization in the presence of the whole or a portion of the polyether polyol (B) and/or the solvent (C) and then adding the remaining portion of the polyether polyol (B) and/or of the solvent (C).

The resin composition for coatings according to the invention can be caused to have a high solid content without impairing the workability thereof or the applicability of the coating compositions prepared therefrom. Such resin composition for coatings can be obtained by appropriately selecting the species and contents of the polyol (A1) or polyol (A2), the polyether polyol (B) and the solvent (C). By doing so, it becomes possible to use the resin composition for coatings according to the invention properly as the so-called high solid resin composition for coatings.

The above-mentioned high solid resin composition for coatings is low in solvent content and excellent in handling properties, and requires a smaller amount of a solvent in diluting to a viscosity suited for application and thus satisfied the requirements imposed from the resources saving and environmental protection viewpoint. In the present specification, the high solid resin composition for coatings is defined as a resin composition for coatings which belongs to the region under the line ABC connecting three points, namely point A (solid content 40% by weight, viscosity 50 mPa·s), point B (solid content 60% by weight, viscosity 400 mPa·s) and point C (solid content 90% by weight, viscosity 10,000 mPa·s) in a semilogarithmic coordinate system the ordinate of which has a logarithmic scale, namely a coordinate system for a logarithmic function, with the solid content (% by weight) of a resin composition for coatings being taken on the abscissa and the viscosity thereof at 25° C. (mPa·s) on the ordinate. In a mode of practice preferred from the workability viewpoint, the relationship between the resin solid content and the viscosity at 25° C. of the high solid resin composition for coatings according to the invention is within the above graphically defined range. In that case, it is preferred that the resin compositions for coatings have a solid content of 50 to 90% by weight and the viscosity thereof be within the range under the line ARC. More preferably, the composition has a solid content of 60 to 90% by weight and the viscosity thereof is within the range under the line ABC. A composition which shows a viscosity lower than 150 mPa·s when diluted to 50% by weight with ethyl acetate is also regarded as a high solid resin composition for coatings. When, in this manner, the viscosity of the resin composition for coatings is within the above-defined range when the composition has a solid content of 40 to 90%, it is possible to reduce the amount of a solvent in diluting the coating composition comprising the resin composition for coatings to an application viscosity with a solvent or the like and thus satisfy the requirements imposed from the resources saving and environmental protection viewpoint.

The resin composition for coatings according to the invention can constitute a curable coating composition. It can also be used as a binder in ink compositions. The curable coating composition can be prepared by adding, according to need, a pigment and/or an additive(s), a solvent such as mentioned above and/or the like to the resin composition for coatings according to the invention and adding a crosslinking agent for curing the coating composition. In this way, a curable coating composition comprising the resin composition for coatings according to the invention and a crosslinking agent can be obtained. Such curable coating composition also constitutes an aspect of the present invention.

In cases that a pigment, an additive and/or a solvent is incorporated in the above curable coating composition, the amount thereof or the method of dissolution or dispersion thereof is not particularly restricted but the addition amount and the method of dissolution or dispersion which are generally used for ordinary polyether polyols or acrylic polyols may be employed.

The above-mentioned pigment is not particularly restricted but includes, among others, those listed below under (1) to (10). These may be used singly or two or more of them may be used in combination.

(1) Extender pigments: heavy calcium carbonate, light fine calcium carbonate, white marble, kaolin, clay, porcelain clay, china clay, diatomaceous earth, hydrous fine silicic acid, talc, barium sulfate, precipitated barium sulfate, barium carbonate, silica powders, wollastonite, etc.

(2) Metal powder pigments: aluminum powders, copper powders, stainless steel powders, nickel powders, etc.

(3) Inorganic pigments: white pigments such as rutile form titanium oxide, anatase form titanium oxide, antimony trioxide zinc white, lithopone, white lead and zinc white (lead oxide); black pigments such as carbon black, lamp black, graphite, iron black, copper/chromium black, copper/iron/manganese black and cobalt/iron/chromium black; red or orange pigments such as molybdate orange and iron oxide red; yellow pigments such as chrome yellow, yellow iron oxide, ocher, titan yellow and titan/antimony/chrome yellow: green pigments such as chrome green, chromium oxide green, cobalt/titan/nickel/zinc green, cobalt/aluminum/chrome green and cobalt green; blue pigments such as ultramarine blue, Prussian blue, cobalt blue and cobalt/aluminum/chrome blue; violet pigments such as cobalt violet and manganese violet, etc.

(4) Organic pigments (red/orange pigments): insoluble azo pigments such as Permanent Red 4R, Dinitroaniline Orange, Brilliant Carmine FB, Permanent Red F5 RK, Pyrazolone Orange, Pyrazolone Red and Benzimidazolone Orange; soluble azo pigments such as Permanent Red 2B, Lake Red, Bordeaux 10B, BON Maroon Medium and BON Maroon Light; anthraquinone pigments such as Anthraquinone Red: thioindigo pigments such as Thioindigo Bordeaux; perylene pigments such as Perylene Red, Perylene Scarlet and Perylene Maroon; quinacridone pigments such as Quinacridone Red, Quinacridone Magenta, Dichloroquinacridone Magenta, Quinacridone Maroon and Quinacridone Scarlet; diketopyrrolopyrrole pigments such as Diketopyrrolopyrrole Red; etc.

(5) Organic pigments (yellow pigments): monoazo pigments such as Fast Yellow G, Fast Yellow 10G, Fast Yellow 5GX, Fast Yellow FGL, Benzimidazolone Yellow H3G and Benzimidazolone Yellow H4G; disazo pigments such as Permanent Yellow HR, condensed azo pigments, Isoindolinone Yellow and Isoindoline Yellow; indanthrene (anthraquinone) pigments such as Anthrapyrimidine Yellow and Flavanthrone Yellow; metal complex pigments such as azomethine copper complex yellow, nitroso nickel complex yellow and nickel azo yellow; quinophthalone yellow pigments such as Quinophthalone Yellow; etc.

(6) Organic pigments (green pigments): chlorinated phthalocyanine green, bromochlorinated phthalocyanine green, etc.

(7) Organic pigments (blue pigments): copper phthalocyanine blue, phthalocyanine blue, C.I. Pigment Blue 15:1, C.I. Pigment Blue 15:2, C.I. Pigment Blue 15:3, C.I. Pigment Blue 15:4, metal-free phthalocyanine blue, Indanthrene Blue, etc.

(8) Organic pigments (violet pigments): Dioxazine Violet, Quinacridone Violet, etc.

(9) Rust preventing pigments: zinc powders, zinc suboxide, red lead, zinc chromate, calcium plumbate, strontium chromate, lead cyanamide, basic lead chromate, basic lead sulfate, phosphate salt rust preventing pigments, molybdate salt rust preventing pigments, phosphomolybdate salt rust preventing pigments, MIOs, etc.

(10) Others: fluorescent pigments, glass beads, litharge, iridescent pigments, dolomite, aluminum silicate, etc.

The above pigments may also be used in the form of dyed pigments.

The above-mentioned additive is not particularly restricted but includes, among others, those listed below under (1) to (16). These may be used singly or two or more of them may be used in combination.

(1) Leveling agents: polyvinyl butyral, polyalkyl acrylates, dimethylsiloxane, etc.

(2) Ultraviolet absorbers: benzotriazoles, benzophenones, salicylates, cyanoacrylates, anilide oxalate, triazines, etc.

(3) Ultraviolet stabilizers: hindered amines, benzoates, etc.

(4) Antioxidants: phenolic, thioether, phosphite and other compounds described in "Antioxidant Handbook" (Ken-ichi Sawatari, published 1976 by Taiseisha), "Plastics", Vol. 43. No. 11 (pp. 52–54, 1992), etc.

(5) Polymerization inhibitors: hydroquinone, metoquinone, benzoquinone, 2,6-di-tert-butyl-4-methylphenol, etc.

(6) Fillers: talc, silica, etc.

(7) Coupling agents: silanes, titanates, etc.

(8) Rust inhibitors: zinc, aluminum phosphate, amino carboxylic acids, etc.

(9) Dehydrating agents: hydrolysable ester compounds such as methyl orthoformate and ethyl orthoformate, etc.

(10) Antimicrobial agents: silver-containing ones, zeolites, quaternary ammonium salts, etc.

(11) Metal inactivators: hydrazines, etc.

(12) Thickeners for solvent-based compositions: organic bentonites, ultrafine silica species, surface-treated calcium carbonate, amide waxes, hydrogenated castor oil-derived waxes, benzylidenesorbitols, various metal soaps, oxidized polyethylenes, polymerized vegetable oil, sulfate ester anionic surfactants, polyether-ester surfactants, polycarboxylic acid amine salts, etc.

(13) Solvent-based dispersants and wetting agents: high-molecular unsaturated polycarboxylic acids, polyether polyester carboxylic acid salts, high-molecular polyester acid polyamine salts, high-molecular polycarboxylic acid salts, phosphate esters, high-molecular polyester acid amide amine salts, long-chain polyamide phosphoric acid salts, aliphatic polyamides, salts from long-chain polyaminoamides and high-molecular polyester acids, phosphate ester salts, high-molecular polyethers, etc.

(14) Antifoaming agents: silicone antifoamers, oxyalkylene antifoamers, Pluronic antifoamers, mineral antifoamers, etc.

(15) Surfactants: anionic, nonionic, amphoteric and other compounds described in "Novel Surface Active Agents" (Hiroshi Horiguchi, published 1986 by Sankyo Shuppan), etc.

(16) Others: reinforcing materials, plasticizers, lubricants, antifogging agents, corrosion inhibitors, pigment dispersing agents, flow modifiers, peroxide decomposing agents, mold decoloring agents, fluorescent brightening agents, organic flame proofing agents, inorganic flame proofing agents, antisagging agents, melt flow modifiers, antistatic agents, antialgal agents, antifungal agents, flame retardants, slip agents, metal chelating agents, antiblocking agents, heat stabilizers, processing stabilizers, colorants, etc.

When the composition contains the crosslinking agent mentioned above, the crosslinking agent can mutually crosslink polyols (A1) or polyols (A2), or polyether polyols (B), or polyol (A1) or polyol (A2) with polyether polyol (B) to give coating films having hardness as well as flexibility.

The curable coating composition of the present invention can be cured under various curing conditions according to the use thereof or the crosslinking agent species and can be used as an ordinary temperature-setting or thermosetting composition, for instance. The addition amount of the crosslinking agent or the method of adding and dispersing the same is not particularly restricted but those addition amounts or methods of addition and dispersion which are generally used in preparing ordinary polyol-containing curable coating compositions may be employed.

The crosslinking agent mentioned above is not particularly restricted as far as it is applicable to acrylic polyols and polyether polyols but includes, among others, (blocked) polyisocyanates, aminoplast resins and so forth. These may be used singly or two or more of them may be used in combination. Among them, those which comprise a (blocked) polyisocyanate compound as an essential component are preferred.

The term "(blocked) polyisocyanate compound" means a polyisocyanate compound and/or a blocked polyisocyanate compound.

The above-mentioned polyisocyanate compound is not particularly restricted but may be any compound having at least two isocyanato groups within each molecule. Thus, it includes, among others, polyisocyanates such as tolylene diisocyanate, xylylene diisocyanate, diphenylmethane-diisocyanate, 1,6-hexamethylene diisocyanate, isophoronediisocyanate, 4,4'-methylenebis(cyclohexyl isocyanate), lysine diisocyanate, trimethylhexamethylene diisocyanate, 1,3-(isocyanatomethyl)cyclohexane, 1,5-naphthalenediisocyanate, triphenylmethanetriisocyanate, methyl 2,6-diisocyanate hexanoate, 2-isocyanatoethyl-2,6-diisocyanatocaproate; adducts, biuret and isocyanurate forms of these polyisocyanates and other polyisocyanate derivatives (modifications).

The above-mentioned blocked polyisocyanate compound generally results from a polyisocyanate compound by blocking of the isocyanato groups of the compound with a blocking agent for causing crosslinking in the step of drying with heating of the curable coating composition and for improving the storage stability thereof at ordinary temperature.

The blocking agent is not particularly restricted but includes among others, $\epsilon$-caprolactam, phenol, cresol, oximes, alcohols and like compounds.

Commercially available as the above (blocked) polyisocyanate compounds are, for example, Sumidur N 3200, Sumidur N 3300, Sumidur BL 3175, Desmodur N 3400, Desmodur N 3600, Desmodur VPLS 2102 (trademarks, products of Sumitomo Bayer Urethane), Duranate E-402-90T (trademark, product of Asahi Chemical Industry), LTI (trademark: KYOWA HAKKO KOGYO Co., Ltd.) and so on. For preventing coating films from yellowing, non-yellowing polyisocyanates with no isocyanato group directly bonded to an aromatic ring are preferred.

The amount of the above (blocked) polyisocyanate is not particularly restricted but preferably is, for example, such that the isocyanato groups in the (blocked) polyisocyanate compound amount to 0.6 to 1.4 moles per mole of the hydroxyl group in the polyol mentioned above. When it is less than 0.6 mole, a large number unreacted hydroxyl groups will remain in the curable coating composition, hence the weathering resistance of the cured coating films formed by using the resulting curable coating composition. When it is in excess of 1.4 moles, a large number of unreacted isocyanato groups will remain in the coating films and react with moisture in air in the step of curing of the coating films, which may possibly cause foaming or whitening of the coating films. More preferred amount is 0.8 to 1.2 moles.

The above-mentioned aminoplast resin is an addition condensation product from an amino-containing compound, such as melamine or guanamine, and formaldehyde. It is also called amino resin.

The aminoplast resin is not particularly restricted but includes, among others, melamine resins such as dimethylolmelamine, trimethylolmelamine, tetramethylolmelamine, pentamethylolmelamine, hexamethylolmelamine, complete alkyl type methylatedmelamine, complete alkyl type butylated melamine, complete alkyl type isobutylated melamine, complete alkyl type mixedly etherified melamine, methylol type methylated melamine, imino type methylated melamine, methylol type mixedly etherified melamine and imino type mixedly etherified melamine; and guanamine resins such as butylated benzoguanamine, methyl/ethyl mixedly alkylated benzoguanamine, methyl/butyl mixedly alkylated benzoguanamine and butylated glycoluril.

As commercial products available as the aminoplast resin, there may be mentioned, among others, Cymel 1128, Cymel 303, Mycoat 506, Cymel 232, Cymel 235, Cymel 771, Cymel 325, Cymel 272, Cymel 254 and Cymel 1170 (all trademarks, products of Mitsui Cytec) and the like.

The use amount of the above aminoplast resin is not particularly restricted but preferably is, for example, such that the solid-basis weight ratio between the polyol and aminoplast resin amounts to 9/1 to 6/4. When the proportion of the polyol is less than 6/4, the resulting coating films become excessively hard, hence the balance between hardness and flexibility may possibly become poor. When the polyol is in excess of 9/1, the crosslinking will not proceed to a sufficient extent, hence the resulting coating films may possibly become inferior in water resistance and/or solvent resistance.

While those species mentioned above can be used as the crosslinking agent, a coating which comprises, as a vehicle, a curable coating composition comprising the resin composition for coatings according to the invention and a (blocked) polyisocyanate compound having at least two isocyanato groups in each molecule can be used as a clear top coating. The clear top coating generally contains no pigment but may contain such a pigment as mentioned above in an amount which will not impair the transparency of the coating films. In cases that such clear top coating is applied to automotive outside sheathings, the resulting coating films are noticeably superior in scratch resistance and acid rain resistance (recent year matter of concern), which are required of automotive outside sheathings, to the conventional acrylic clear top coating in which an aminoplast resin is used.

The above curable coating composition may contain, where necessary, a curing catalyst for promoting the crosslinking reaction of the hydroxyl groups of the polyol with the crosslinking agent. Such curing catalyst is not particularly restricted. When the above-mentioned (blocked) polyisocyanate compound is used, however, such catalysts as the temperature-sensitive catalysts, as described later, showing their catalytic activity at more than specific temperature, metal-containing organic compounds showing their catalytic activity at an ordinary temperature or under heating (e.g. dibutyltin dilaurate) and tertiary amines are preferably used. When the above-mentioned aminoplast resin is used, acidic or basic curing catalysts are preferably used. These may be used singly or two or more of them may be used in combination. Among them, temperature-sensitive catalysts and metal-containing organic compounds (e.g. dibutyltin dilaurate) are preferred and, when said metal-containing organic compound is used, an acidic substance is preferably used in combination. Thus, in a preferred embodiment of the curable coating composition of the invention, the crosslinking agent comprises a (blocked) polyisocyanate as an essential constituent and the curable coating composition further contains (1) a metal-containing organic compound and an acidic substance or (2) a temperature-sensitive catalyst. The metal-containing organic compound plus acidic substance and the temperature-sensitive catalyst may be used simultaneously.

In cases that the above crosslinking agent comprises a (blocked) polyisocyanate compound as an essential constituent, the curable coating composition of the invention becomes, in the process of drying, a polyurethane resin-based coating composition, which is a reaction curing type coating as a result of formation of urethane bonds by reaction of hydroxyl groups with isocyanato groups. In the mode of embodiment (1), the reactivity in the step of curing is high owing to the combined use of the metal catalyst and acidic substance and coating films having a good appearance are formed and, further in case of two-component coating, the pot life of the coating can be secured for a sufficient period of time. In particular when the molecular weight of the polyol is small, it becomes necessary to increase the addition amount of the catalyst for securing drying characteristics; as a result, the pot life of the coating is shortened. By using the technique mentioned above, however, it becomes possible to maintain the pot life to a sufficient extent.

In the above-mentioned mode of embodiment (1), the metal-containing organic compound is not particularly restricted provided that it is an organometallic compound having at least one metal-carbon bond or a metal-containing organic compound having at least one metal-hetero atom bond. Thus, it includes not only organometallic compounds but also fatty acid salts of organometallic compounds, thioglycolic acid ester salts of organometallic compounds, metal soaps and the like, and one or two or more of them can be used. The term "metal soaps" as used herein means metal salts other than fatty acid alkali metal salts (soaps in a narrow sense). Such metal-containing organic compounds are not particularly restricted but may be, for example, metal-containing organic compounds containing a transition metal element belonging to one of the groups 3A to 7A, 8 and 1B or a metal element belonging to one of the groups 2B to 6B of the periodic table. Metal-containing organic compounds containing at least one metal selected from the group consisting of tin, zinc, lead and bismuth are preferred, however. Among them, tin-containing organic compounds are particularly preferred from the viewpoint of curing catalytic activity, weathering resistance, coating films coloration and cost.

As the tin-containing organic compounds, there may be mentioned, for example, organotin compounds such as dibutyltin dichloride; fatty acid salts of organotin compounds, such as dibutyltin dilaurate, dibutyltin di(2-ethylhexanoate), dibutyltin diacetate, dihexyltin diacetate, dioctyltin dilaurate, stannous octoate, tetra-n-butyl-1,3-diacetoxydistannoxane (trademark: TK-1, product of Takeda Chemical Industries); thioglycolic acid ester salts of organotin compounds, such as dimethyltin bis (isooctyl thioglycolate) and dioctyltin bis(isooctyl thioglycolate); metal soaps such as stannous octylate, stannous decanoate; etc.

As the zinc-containing organic compounds, there may be mentioned, among others, zinc 2-ethylhexanoate and zinc naphthenate. As the lead-containing organic compounds, there may be mentioned, for example, lead stearate, lead 2-ethylhexanoate and lead naphthenate. As the bismuth-containing organic compounds, there may be mentioned, among others, bismuth 2-ethylhexanoate and bismuth naphthenate.

The weight proportion of the metal-containing organic compound in the curable coating composition is preferably, for example, 1 ppm to 5% by weight per 100% by weight of the curable coating composition. When it is less than 1 ppm, the desired reaction curability will not be obtained, hence the weathering resistance, chemical resistance and water resistance, among others, of the resulting coating films may possibly decrease. At an amount exceeding 5% by weight, the reaction curability becomes markedly rapid, hence the resulting coating films may possibly fail to obtain a good appearance or the pot life of the coating may possibly be not maintainable. A more preferred range is 10 ppm to 1% by weight and a still more preferred range is 50 ppm to 0.5% by weight.

The above-mentioned acidic substance exhibits a catalytic activity in the reaction when used alone but, when used in combination with the metal-containing organic compound mentioned above, suppresses the catalytic activity of the metal-containing organic compound. The term "acidic substance" means a compound not less acidic than trichloroacetic acid which shows a pKa value of 0.66 in an aqueous solution at 25° C. Thus, carboxylic acids are judiciously used. Among the carboxylic acids, those which are liquid at ordinary temperature (25° C.) and have a boiling point not higher than 350° C. at ordinary pressure are preferred. According to the use conditions, those carboxylic acids which are volatile under curing reaction conditions may preferably be selected in certain instances. The above acidic substances may be used singly or two or more of them may be used in combination.

As the above carboxylic acids, there may be mentioned, among others, alkyl carboxylic acids, aralkyl carboxylic acids, aryl carboxylic acids, alkaryl carboxylic acids, cycloalkyl carboxylic acids, alkenyl carboxylic acids, cycloalkenyl carboxylic acids, other hydrocarbon-based carboxylic acids, substituted hydrocarbon-based carboxylic acids, substitution products derived from these, and so on. More preferred are alkyl carboxylic acids, aryl carboxylic acids, alkenyl carboxylic acids and cycloalkyl carboxylic acids. Still more preferred are alkyl carboxylic acids.

As the alkyl carboxylic acids, there may be mentioned, among others, acetic acid, propionic acid, hexanoic acid, 2-ethylhexanoicacid, octanoicacid, decanoicacid, lauricacid, stearic acid, chloroacetic acid, dichloroacetic acid and trichloroacetic acid. Preferred are alkyl carboxylic acid containing 2 to 20 carbon atoms in total. When the total number of carbon atoms is less than 2 or more than 20, the effects of the present invention may not be produced to a satisfactory extent. In cases that the coating composition has a two-component form and the curing temperature is not higher than 100° C., it is preferred from the viewpoint of workability and coating film physical properties to select a carboxylic acid containing 2 to 6 carbon atoms in total which is liquid at ordinary temperature and volatile under curing reaction conditions. Further, from the viewpoint of skin corrosiveness, toxicity, safety and cost, it is particularly preferred to select acetic acid or propionic acid.

The weight proportion of the acidic substance in the curable coating composition is preferably 10 ppm to 10% by weight, more preferably 50 ppm to 5% by weight, still more preferably 100 ppm to 3% by weight, per 100% by weight of the curable coating composition, for instance. The mole ratio between the acidic substance and the metal-containing organic compound (number of moles of acidic substance/number of moles of metal-containing organic compound) is preferably 1/3 to 200/1, more preferably 1/2 to 150/1, still more preferably 1/1 to 100/1.

In the above mode of embodiment (2), the term "temperature-sensitive catalyst" means a catalyst exhibiting its catalytic activity at 60° C. or above for the reaction between hydroxyl and isocyanato groups. Unlike ordinary catalysts, such a temperature-sensitive catalyst does not promote the reaction between hydroxyl and isocyanato groups at a temperature lower than that showing catalytic activity. Therefore, when the coating has a two-component form, the use of such a temperature-sensitive catalyst renders the composition quick-drying and makes it possible to maintain the pot life at a satisfactory level. Further, since application is generally performed at room temperature and the reaction between hydroxyl and isocyanato groups does not proceed just after application, there is a sufficient time after application for the leveling of the coating films, hence a high quality appearance can be obtained. It is more preferred to use a catalyst showing its catalytic activity at 70° C. or above as the temperature-sensitive catalyst.

As a specific example of the temperature-sensitive catalyst, there may be mentioned, by chemical name or trademark, mono-n-butyltin fatty acid salt showing its catalytic activity of the reaction between hydroxy and isocyanato groups at 80° C. (trademark: SCAT-24, product of Sankyo Yuki Gosei). Since when this catalyst is used, an acid, when contained in the curable coating composition, tends to shorten the pot life, it is preferred that the composition contains no acid.

The weight proportion of the temperature-sensitive catalyst is preferably 10 ppm to 5% by weight, for instance, per 100% by weight of the curable coating composition. At below 10 ppm, the desired curability will not be exhibited, hence the weathering resistance, chemical resistance and water resistance, among others, of the coating films may possibly decrease. At an amount above 5% by weight, the reaction curability becomes excessively rapid, hence no good coating film appearance may be obtained or the pot life of the coating may no longer be maintained. A range of 30 ppm to 2% by weight is more preferred and 50 ppm to 0.5% by weight is still more preferred.

As specific examples of the curing catalyst which can be used in the curable coating composition according to the invention, there may be mentioned, in addition to those already mentioned hereinabove, phosphoric acid and phosphate esters, such as phosphoric acid, monomethyl phosphate, monoethyl phosphate and dibutyl phosphate; organic sulfonic acids such as p-toluenesulfonic acid, methanesulfonic acid, dodecylbenzenesulfonic acid, methyl p-toluenesulfonate; basic catalysts such as sodium methoxide, sodium ethoxide, potassium methoxide, potassium ethoxide, potassium tert-butoxide, sodium hydroxide and potassium hydroxide; amine catalysts such as ammonia, triethylamine and tripropylamine: etc.

The above curable coating composition, when applied to a substrate and cured, can form a coating film.

The substrate is not particularly restricted but includes, among others, inorganic substrates such as glass, slates, concrete, mortar, ceramics and stones; metallic substrates such as plates made of aluminum, iron, zinc, tin, copper, titanium, stainless steel, tin plates, galvanized iron sheets, zinc-, copper-, chromium- or like metal-plated metals, chromate- or phosphate-treated or other surface treated metals and the like; plastics substrates made of polyethylene, polyvinyl chloride, ABSs (acrylonitrile-butadiene-styrene), FRPs (fiber-reinforced plastics), polyethylene terephthalate, polycarbonates, polymethyl methacrylate, polystyrene, polypropylene, polyesters, polyolefins, acrylic resins, epoxy resins, nylon resins, etc.; synthetic leathers; wood substrates made of hinoki (Japanese cypress), cedar, pine or the like, plywoods, etc.; other organic materials such as fibers, paper and the like. These substrates may be coated with a primer, undercoating, intermediate coating, and/or top coating such as metallic base coating and the like prior to application of the curable coating composition.

The method of applying the above curable coating composition to form coating films therefrom and the method of curing are not particularly restricted but may appropriately be selected according to the field of application in which the curable coating composition is used. Thus, the method of application includes, among others, immersion coating, brush coating, roll and brush coating, spray coating, roll coating, spin coating, dip coating, bar coating, flow coating, electrostatic coating, die coating, film lamination, gel coating and like coating techniques. The curing can be effected in the manner of ordinary temperature curing or curing with heating, for instance.

The film thickness of the coating film obtained from the above-mentioned curable coating composition is not particularly restricted but may appropriately be selected according to application to be desired.

The above curable coating composition can also form coatings excellent in basic performance characteristics, such as hardness, luster, feel of thickness and solvent resistance, having very high levels of weathering resistance and further having flexibility. Therefore, the field of application of the curable coating composition of the present invention is not particularly restricted but the composition can suitably be used as an undercoating, intermediate coating or top coating, for example for plastics moldings, inclusive of films and sheets, solar cells, polymer cells, household electric appliances, steel products, large-sized structures, automobiles, ships, buildings, building materials, woodwork, guard fences, displays, machines, tools or utensils, industrial instrument, glass products and various industrial products. The composition can provide various substrates with such basic performance characteristics as mentioned above, protecting the substrate surface against mechanical shocks, providing the surface with a good appearance, prolonging the life of substrates by causing protective, decorative and like functions to last, and reducing the cost of maintenance. The composition can have a high solid content and thus satisfies the requirements imposed from the resources saving and environmental protection viewpoint.

The resin composition for coatings and the curable coating composition of the invention, which are constituted as mentioned above, can provide cured coating films having good basic performance characteristics, for example high luster and high weathering resistance, as well as high hardness and good flexibility and can have a high solid content. The curable coating composition of the invention shows high reactivity in the process of curing and thus can form coatings with a good appearance and, in addition, the coating composition can maintain the pot life thereof for a satisfactory period. Therefore, the resin composition for coatings and the curable coating composition of the invention, when applied to buildings, automobiles, ships, industrial apparatus and equipment, various industrial products and so forth, can provide basic performance characteristics such as hardness, luster, feel of thickness and solvent resistance, protect the surface against mechanical shocks and give a good appearance to the same, prolong the product life by maintaining the protective, decorative and like functions, and reduce the cost of maintenance.

EXAMPLES

The following examples illustrate the present invention in more detail. They are, however, by no means limitative of the scope of the present invention. "Part(s)" means "part(s) by weight".

Example 1

A four-necked flask equipped with a stirrer, thermometer, condenser and nitrogen inlet tube was charged with 60 parts of n-butyl acetate as solvent (C) and 40 parts of the polypropylene glycol (PPG) (trademark: G-700, product of Asahi Denka Kogyo) specified in Table 1, the contents were heated to 130° C., and a mixed solution composed of the polymerizable unsaturated monomer composition as specified in Table 1 and tert-butyl peroxy-2-ethylhexanoate (PBO) (polymerization initiator, trademark: Perbutyl O, product of NOF Corp.) was added dropwise over 6 hours. The subsequent 2 hours of maintenance gave a resin composition for coatings comprising a polyol (A1) resulting from copolymerization of the polymerizable unsaturated monomer composition, the polyether polyol (B) and the solvent (C) with a nonvolatile matter content of 70.1%. The polymerization initiator PBO was used in an amount of 8% by weight relative to the total amount of the polymerizable unsaturated monomer composition.

The weight ratio (Ac/PPG) between the polyol (A1) and polyether polyol (B) in the thus-obtained resin composition for coatings was as shown in Table 1. The Tg, number average molecular weight and hydroxyl value of the polyol (A1) as well as the nonvolatile matter content, hydroxyl value and viscosity (measured at 25° C. using a Gardner tube) of the resin composition for coatings as comprising the polyol (A1), polyether polyol (B) and solvent (C) were as shown in Table 1.

In Examples 2, 5, 6, 8–17, 19–20 and 22–25 and Comparative Examples 1–3, the formulations given in Tables 1 to 4 were employed. According to the procedure of Example 1, the flask was charged with the solvent (C) and polyether polyol (B) and a mixed solution composed of each polymerizable unsaturated monomer composition specified in one of Tables 1 to 4 and the polymerization initiator PBO (trademark: Perbutyl O, product of BOF) was added dropwise over 6 hours. The subsequent 2 hours of maintenance gave a resin composition for coatings as comprising the polyol (A1) or polyol (A2), polyether polyol (B) and solvent (C). The polymerization initiator PBO was used in an amount of 8% by weight relative to the total amount of the polymerizable unsaturated monomer composition. The nonvolatile matter content, hydroxyl value and viscosity (measured at 25° C. using a Gardner tube) of each resin composition for coatings were as shown in Tables 1 to 4.

Example 3

A resin composition for coating was prepared in the same manner as in Example 1 from the resin composition for coatings as obtained in Example 1 except that the resin composition was diluted to a solid content of 40% by weight with n-butyl acetate.

The coatings on the test panels obtained were evaluated in the same manner as in Example 1. The nonvolatile matter content, hydroxyl value and viscosity (measured at 25° C. using a Gardner tube) of each resin composition for coatings were as shown in Table 1.

Example 4

A resin composition for coating was prepared in the same manner as in Example 1 except that the solvent n-butyl acetate was removed after preparation of the polyol (A1) by polymerization. The nonvolatile matter content, hydroxyl value and viscosity (measured at 25° C. using a Gardner tube) of each resin composition for coatings were as shown in Table 1.

Example 7

A four-necked flask equipped with a stirrer, thermometer, condenser and nitrogen inlet tube was charged with 60 parts of n-butyl acetate as solvent (C) and 40 parts of the polypropylene glycol (PPG) specified in Table 1 as polyether polyol (B), the contents were heated to 130° C., and a mixed solution composed of the polymerizable unsaturated monomer composition as specified in Table 1 and PBO (trademark: Perbutyl O, product of NOF) was added dropwise over 3 hours. The subsequent 2 hours of maintenance gave a resin composition for coatings comprising a polyol (A1) resulting from copolymerization of the polymerizable unsaturated monomer composition, the polyether polyol (B) and the solvent (C). The polymerization initiator PBO was used in an amount of 8% by weight relative to the total amount of the polymerizable unsaturated monomer composition.

Example 18

A four-necked flask equipped with a stirrer, thermometer, condenser and nitrogen inlet tube was charged with 60 parts of n-butyl acetate as solvent (C), the contents were heated to 130° C., and a mixed solution composed of the polymerizable unsaturated monomer composition as specified in Table 1 and PBO (trademark: Perbutyl O, product of NOF) was added dropwise over 6 hours. The mixture was maintained at that temperature for 2 hours. The polymerization initiator PBO was used in an amount of 8% by weight relative to the total amount of the polymerizable unsaturated monomer composition. Then, thereto was added, as the polyether polyol (B), the polypropylene glycol (PPG) specified in Table 2 (trademark: EDP-1100, product of Asahi Denka Kogyo) to give a resin composition for coatings comprising a polyol (A1) resulting from copolymerization of the polymerizable unsaturated monomer composition, the polyether polyol (B) and the solvent (C).

Example 21

A four-necked flask equipped with a stirrer, thermometer, condenser and nitrogen inlet tube was charged with 60 parts of n-butyl acetate as solvent (C), the contents were heated to 130° C., and a mixed solution composed of the polymerizable unsaturated monomer composition as specified in Table 3 and the polymerization initiator 2,2'-azobis(2-methylbutyronitrile) was added dropwise over 4 hours at the distillation temperature. The mixture was maintained at that temperature for 2 hours. The polymerization initiator 2,2'-azobis(2-methylbutyronitrile) was used in an amount of 10% by weight relative to the total amount of the polymerizable unsaturated monomer composition. Then, thereto was added, as the polyether polyol (B), the polypropylene glycol (PPG) specified in Table 3 (trademark: G-3000, product of Asahi Denka Kogyo) to give a resin composition for coatings comprising a polyol (A2) resulting from copolymerization of the polymerizable unsaturated monomer composition, the polyether polyol (B) and the solvent (C). The weight ratio (Ac/PPG) between the polyol (A2) and polyether polyol (B) in the thus-obtained resin composition for coatings was as shown in Table 3.

Examples 26 and 27

Examples 26 and 27 are shown in Table 3. A flask was charged with solvent (C) and polyether polyol (B), and a mixed solution composed of the polymerizable unsaturated monomer composition as specified in Table 3 and the polymerization initiator 2,2'-azobis(2-methylbutyronitrile) (trademark: ABN-E, Japan Hydrazine Kogyo) was added dropwise over 4 hours at the distillation temperature. The mixture was maintained for 2 hours to give a resin composition for coatings comprising the polyol (A1) or polyol (A2), the polyether polyol (B) and the solvent (C) In these examples, the polymerization initiator ABN-E was used in an amount of 10% by weight relative to the total amount of the polymerizable unsaturated monomer composition. The nonvolatile matter content, hydroxyl value and viscosity (measured using a Gardner tube) of each resin composition for coatings were as shown in Table 3.

Method of Forming Coating Films

A curable coating composition was prepared by one of the preparation methods mentioned below under (1) to (3) using the obtained resin composition for coating and a crosslinking agent. Further, coating films were formed and test specimens were prepared by applying each obtained curable coating composition to white panels obtained by applying a two-component urethane resin enamel to 0.8-mm-thick zinc phosphate-treated steel sheets. The crosslinking agent used and the formulation amount thereof were as shown in Tables 1 to 4.

(1) Method of Preparation Using N 3300 (Sumidur N 3300) as Crosslinking Agent

To each resin composition for coatings as obtained was added Sumidur N 3300 (trademark, polyisocyanate compound, product of Sumitomo Bayer Urethane) as a crosslinking agent in an amount such that the equivalent ratio between hydroxyl groups in the resin composition for coatings and isocyanato groups of the crosslinking agent amounted to 1/1. The curable coating composition obtained after thorough mixing was diluted by adding a thinner composed of toluene/xylene/n-butyl acetate (weight ratio= 1/1/1) to thereby adjust the viscosity of the mixture to 10 seconds as measured with an Iwata cup, whereby a clear coating composition having a viscosity enabling the same to be applied by air spraying.

Then, the clear coating obtained was applied, by air spraying to a dry film thickness of about 30 μm, to white panels. After forced drying, the panels were subjected to various tests. The time for forced drying so referred to Tables 1 to 6 is the time until the emergence of solvent resistance; the shorter the drying time is, the more quick-drying the coating is.

(2) Method of Preparation Using BL 3175 (Sumidur BL 3175) as Crosslinking Agent

To each resin composition for coatings as obtained in the above manner was added Sumidur BL 3175 (trademark, blocked polyisocyanate compound, product of Sumitomo Bayer Urethane) as a crosslinking agent in an amount such that the equivalent ratio between hydroxyl groups in the resin composition for coatings and isocyanato groups in the crosslinking agent amounted to 1/1, followed by further addition of 250 ppm, relative to the total solids, of TK-1 (trademark, product of Takeda Chemical Industries) and 1,000 ppm, relative to the total solids, of DBTDL. The curable coating composition obtained after thorough mixing was diluted with a thinner composed of toluene/xylene/n-butyl acetate (weight ratio=1/1/1) to thereby adjust the viscosity of the resulting mixture to 10 seconds as measured with an Iwata cup, whereby a clear coating capable of being applied by air spraying was obtained.

Then, the clear coating obtained was applied, by air spraying to a dry film thickness of about 30 μm, to white panels. The panels were maintained at room temperature for 5 minutes, followed by forced drying, and then the panels were subjected to various tests. In these methods, time for forced drying is consistent with the time for showing the solvent resistance.

(3) Method of Preparation Using Cymel 235

To each resin composition for coatings as obtained in the above manner was added Cymel 235 (trademark, aminoplast resin, product of Mitsui Cytec) as a crosslinking agent in an amount such that the weight ratio, on the solid basis, between the polyols and the aminoplast resin amounted to 80/20, followed by further addition of 1,000 ppm, relative to the total solids, of p-toluenesulfonic acid. The curable coating composition obtained after thorough mixing was diluted with a thinner composed of toluene/xylene/n-butyl acetate (weight ratio=1/1/1) to thereby adjust the viscosity of the resulting mixture to 10 seconds as measured with an Iwata cup, whereby a clear coating capable of being applied by air spraying was obtained.

Then, the clear coating obtained was applied, by air spraying to a dry film thickness of about 30 μm, to white panels as mentioned above. The panels were maintained at room temperature for 5 minutes, followed by forced drying, and then the resulting panels were subjected to various tests. In these methods, time for forced drying is consistent with the time for showing the solvent resistance.

The coating films of the test panels obtained were evaluated by the methods shown below under (1) to (6). The evaluation results are shown in Tables 1 to 4.

Methods of Evaluating Test Specimens (1) Appearance

The coating films after forced drying were evaluated for the conditions (luster, smoothness and image sharpness) by visual observation. The evaluation criteria were as follows:

⊚: excellent; ◯: good; Δ: fair; X: poor.

(2) Glossiness

The glossiness was measured according to JIS K 5400 at a light source incident angle of 60using VZ-2000 (trademark, product of Nippon Denshoku).

(3) Pencil Hardness

A pencil scratch test was carried out according to JIS K 5400 8.4.1 (testing machine method) and the hardness of that pencil which made a scratch on the coating film was reported as the hardness.

(4) Flexibility

The flex test prescribed in JIS K 5400 8.1 (rod diameter: 2 mm) was carried out and evaluation was made as to whether peeling of the coating film occurred or not.

⊚: excellent; ◯: good; Δ: average; X: poor.

(5) Impact Resistance

The test was carried out according to JIS K 5400 8.3.2 (du Pont method) and the conditions of the coating films were evaluated for the respective falling heights.

◯: no change; X: cracking and/or peeling.

(6) Solvent Resistance

After forced drying, the test panels were cooled by allowing to stand at room temperature for 10 minutes. Then, the coating films were rubbed 50 times with absorbent cotton impregnated with toluene and the coating films were then evaluated for surface conditions by visual observation. The evaluation criteria were as follows:

◯: no change; X: reduction in gloss; XX: dissolution and disappearance of coating films.

Further, a weathering resistance test was carried out by the method shown below using the coating films obtained in Example 1, Example 12 and Example 20.

Weathering Resistance Test (QUV Test)

The test was carried out according to JIS K 5400-1979 using, as the measuring apparatus, Toyo Seiki Seisakusho's model UVCON UC-1. As regards the measuring conditions, a cycle of 4 hours of irradiation at 70° C. and 4 hours of wetting at 50° C. was repeated, and the degree of yellowing (Δb) was measured initially and after the lapse of 500 hours. Δb (degree of yellowing) Measurements were made according to JIS K 5400 using Nippon Denshoku's model SE-2000.

As a result, the coating films obtained in Example 1 showed a Δb of 3, those obtained in Example 12 showed a Δb of 10 and those obtained in Example 20 showed a Δb of 1. Thus, the curable coating composition of Example 1, in which the polyol (A1) contains a cycloalkyl structure-containing polymerizable unsaturated monomer, gave coating films having a very high level of weathering resistance as compared with the curable coating composition of Example 12, which was free of any cycloalkyl structure-containing polymerizable unsaturated monomer. Further, the curable coating composition of Example showed a marked improvement in weathering resistance owing to the combined use of the cycloalkyl structure-containing polymerizable unsaturated monomer and the ultraviolet stabilizing group-containing polymerizable unsaturated monomer with the polyol (A1).

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Polyol (A1) | Polymerizable unsaturated monomers (parts) | MAA | 3.2 | 2.6 | 3.2 | 3.2 | — | 2.9 | 3.2 | 3.2 | 3.2 | 3.2 |
| | | HEMA | 27 | — | 27 | 27 | 20 | 60.4 | — | 27 | — | 27 |
| | | HPMA | — | 66.9 | — | — | 10 | — | — | — | 25 | — |
| | | HEA | — | — | — | — | — | — | 12.4 | — | — | — |
| | | PX-1 | — | — | — | — | — | — | — | — | 40 | — |
| | | 4MeOHCHMMA | — | — | — | — | — | — | — | — | — | — |
| | | St | 20 | 17.4 | 20 | 20 | 10 | 5 | 30 | 20 | 20 | 20 |
| | | CHMA | 40 | 13.1 | 40 | 40 | 55 | 28 | 51 | — | 11.8 | — |
| | | IB-X | — | — | — | — | — | — | — | 49.8 | — | — |
| | | MMA | — | — | — | — | — | — | — | — | — | — |
| | | t-BMA | — | — | — | — | — | — | — | — | — | — |
| | | i-BMA | — | — | — | — | — | — | — | — | — | 29 |
| | | BMA | 9.8 | — | 9.8 | 9.8 | — | — | — | — | — | — |
| | | BA | — | — | — | — | 5 | 3.4 | 3.4 | — | — | 20.8 |
| | | LMA | — | — | — | — | — | — | — | — | — | — |
| | | 2EHA | — | — | — | — | — | — | — | — | — | — |
| | Tg | | 73 | 46 | 73 | 73 | 60 | 60 | 65 | 121 | 31 | 73 |
| | Ac—Mn | | 4000 | 4000 | 4000 | 4000 | 4000 | 5000 | 5000 | 4000 | 4000 | 4000 |
| | OHV | | 117 | 261 | 117 | 117 | 125 | 261 | 60 | 117 | 270 | 117 |
| | Ac/PPG(wt %) | | G-700 100/40 | G-700 100/70 | G-700 100/40 | G-700 100/40 | P-1000 100/20 | G-700 100/90 | G-700 100/40 | G-700 100/40 | G-700 100/70 | G-700 100/40 |
| | Total OHV | | 148 | 246 | 148 | 148 | 123 | 244 | 107 | 148 | 251 | 148 |
| | NV (%) | | 70.1 | 79.3 | 40.4 | 85.7 | 69.8 | 79.2 | 70.3 | 69.7 | 80.3 | 69.6 |
| | Viscosity (Gardner) | | X⁻ | Z₈ | A₁ | Z₄–Z₅ | Z₃ | Z–Z₁ | V–W | U–V | W–X | U⁺ |
| Polyether polyol (B) (PPG) | Solvent | | n-butyl acetate | n-butyl acetate | n-butyl acetate | n-butyl acetate | n-butyl acetate | n-butyl acetate | n-butyl acetate | n-butyl acetate | n-butyl acetate | n-butyl acetate |
| | Solvent Amount | | 60 | 43 | 210 | 25 | 51 | 48 | 60 | 60 | 43 | 60 |
| | Crosslinking agent | | N3300 | N3300 | N3300 | N3300 | N3300 | N3300 | N3300 | N3300 | N3300 | N3300 |
| | Mixing ratio | | Equivalent | Equivalent | Equivalent | Equivalent | Equivalent | Equivalent | Equivalent | Equivalent | Equivalent | Equivalent |
| Evaluation results | Appearance | | ◎ | ◎ | ◎ | ◎ | ◎ | ◎ | ◎ | ◎ | ◎ | ◎ |
| | Grossiness | | 97 | 96 | 97 | 97 | 97 | 96 | 97 | 97 | 95 | 95 |
| | Hardness | | H | F | H | H | F | HB | F | 2H | H | HB |
| | φ2 mm | | ◎ | ◎ | ◎ | ◎ | ◎ | ◎ | ◎ | ◎ | ◎ | ◎ |
| | Impact resistance | | ○ | ○ | ○ | ○ | ○ | ○ | ○ | ○ | ○ | ○ |
| Temperature and time for forced drying (time until emergence of solvent resistance) | | | 80° C. 1H | 80° C. 2H | 80° C. 1H | 80° C. 1H | 80° C. 4H | 80° C. 2H | 80° C. 1H | 80° C. 1H | 80° C. 2H | 80° C. 1H |

TABLE 2

| | | | Example | | | | | | | | |
|---|---|---|---|---|---|---|---|---|---|---|---|
| | | | 11 | 12 | 13 | 14 | 15 | 16 | 17 | 18 | 19 | 20 |
| Polyol (A1) | Polymerizable unsaturated monomers (parts) | MAA | 3.2 | 3.2 | 3.2 | — | 3.2 | 3.2 | 2.6 | 1.6 | 3.2 | 3.2 |
| | | HEMA | 27 | 27 | 27 | — | 27 | 27 | — | 27.8 | 27 | 27 |
| | | HPMA | — | — | — | — | — | — | 25 | — | — | — |
| | | HEA | — | — | — | — | — | — | — | — | — | — |
| | | PX-1 | — | — | — | 42 | — | — | — | — | — | — |
| | | 4MeOHCHMMA | — | — | — | — | — | — | — | — | — | — |
| | | St | 20 | 65 | 20 | 58 | 20 | 20 | 30 | 20 | 20 | 20 |
| | | CHMA | 26.8 | — | 40 | — | 26.8 | 40 | 32.4 | 50.6 | 40 | 39 |
| | | IB-X | 10 | — | — | — | — | — | — | — | — | — |
| | | MMA | — | — | — | — | — | — | — | — | — | — |
| | | t-BMA | — | — | — | — | 23 | — | — | — | — | — |
| | | i-BMA | — | — | — | — | — | — | — | — | — | — |
| | | BMA | 13 | 4.8 | 9.8 | — | — | 9.8 | 10 | — | 9.8 | 9.8 |
| | | BA | — | — | — | — | — | — | — | — | — | — |
| | | LMA | — | — | — | — | — | — | — | — | — | — |
| | | 2EHA | — | — | — | — | — | — | — | — | — | — |
| | | LA-82 | — | — | — | — | — | — | — | — | — | 1.0 |
| | Tg | | 73 | 73 | 73 | 50 | 76 | 73 | 65 | 79 | 73 | 73 |
| | Ac—Mn | | 4000 | 4000 | 4000 | 4000 | 4000 | 4000 | 4000 | 5000 | 4000 | 4000 |
| | OHV | | 117 | 117 | 117 | 119 | 117 | 117 | 97 | 120 | 117 | 117 |
| Polyether polyol (B) (PPG) | | | G-700 | G-700 | P-400 | G-700 | G-700 | G-700 | G-700 | EDP-1100 | G-700/P-400 | G-700 |
| Polyol | Ac/PPG(wt %) | | 100/40 | 100/40 | 100/40 | 100/40 | 100/40 | 100/40 | 100/70 | 100/40 | 100/30/10 | 100/40 |
| | Total OHV | | 148 | 148 | 148 | 149 | 148 | 148 | 134 | 150 | 151 | 148 |
| | NV (%) | | 70 | 70.5 | 69.4 | 69.9 | 70.1 | 70.1 | 80.2 | 70.2 | 69.6 | 70.5 |
| | Viscosity (Gardner) | | X–Y | Y–Z | O–P | W–X | X–Y | X– | Z+ | Y–Z | U–V | Y |
| Solvent | | | n-butyl acetate | n-butyl acetate | n-butyl acetate | n-butyl acetate | n-butyl acetate | n-butyl acetate | n-butyl acetate | n-butyl acetate | n-butyl acetate | n-butyl acetate |
| Solvent amount | | | 60 | 60 | 60 | 60 | 60 | 60 | 43 | 60 | 60 | 60 |
| Crosslinking agent | | | N3300 | N3300 | N3300 | N3300 | N3300 | BL3175 | Cymel 235 | N3300 | N3300 | N3300 |
| Mixing ratio | | | Equivalent | Equivalent | Equivalent | Equivalent | Equivalent | Equivalent | 80/20 | Equivalent | Equivalent | Equivalent |
| Evaluation results | Appearance | | ◎ | ◎ | ◎ | ◎ | ◎ | ◎ | ◎ | ◎ | ◎ | ◎ |
| | Grossiness | | 97 | 97 | 97 | 97 | 97 | 94 | 98 | 97 | 97 | 97 |
| | Hardness | | H | 2H | F | F | H | H | HB | H | H | H |
| | φ 2 mm | | ◎ | ◎ | ◎ | ◎ | ◎ | ◎ | ◎ | ◎ | ◎ | ◎ |
| | Impact resistance | | ○ | ○ | ○ | ○ | ○ | ○ | ○ | ○ | ○ | ○ |
| Temperature and time for forced drying (time until emergence of solvent resistance) | | | 80° C. 1H | 80° C. 1H | 80° C. 2H | 80° C. 1H | 80° C. 1H | 160° C. 0.5H | 160° C. 0.5H | 80° C. 1H | 80° C. 2H | 80° C. 1H |

TABLE 3

|  |  |  | Example | | | | | | |
|---|---|---|---|---|---|---|---|---|---|
|  |  |  | 21 | 22 | 23 | 24 | 25 | 26 | 27 |
| Polyol (A1) or (A2) | Polymerizable unsaturated monomers (parts) | MAA | 0.9 | 3.2 | 3.2 | 3.2 | 3.2 | — | 2.1 |
|  |  | HEMA | 39 | 27 | 27 | 27 | 27 | — | — |
|  |  | HPMA | — | — | — | — | — | 31 | 31 |
|  |  | HEA | — | — | — | — | — | — | — |
|  |  | PX-1 | 5.0 | — | — | — | — | — | — |
|  |  | 4MeOHCHMMA | — | — | — | — | — | — | — |
|  |  | St | — | 20 | 20 | 20 | — | 5 | 20 |
|  |  | CHMA | — | — | — | — | — | — | 46.9 |
|  |  | 4MCHMMA | — | 40 | — | — | — | — | — |
|  |  | CHMMA | — | — | 40 | — | — | — | — |
|  |  | CHA | — | — | — | 27.4 | — | — | — |
|  |  | IB-X | — | — | — | — | — | — | — |
|  |  | MMA | — | — | — | — | — | — | — |
|  |  | t-BMA | 35.0 | — | — | — | 61.3 | 59.2 | — |
|  |  | i-BMA | 4.6 | — | — | 22.4 | — | — | — |
|  |  | BMA | — | 9.8 | 9.8 | 9.8 | — | — | — |
|  |  | BA | — | — | — | — | — | — | — |
|  |  | LMA | 15.5 | — | — | — | — | — | — |
|  |  | 2EHA | — | — | — | — | 8.5 | 4.8 | — |
|  |  | LA-82 | — | — | — | — | — | — | — |
|  | Tg |  | 42 | 51 | 57 | 60 | 73 | 70 | 67 |
|  | Ac—Mn |  | 3000 | 4000 | 4000 | 4000 | 4000 | 3000 | 3000 |
|  | OHV |  | 190 | 117 | 117 | 117 | 148 | 121 | 121 |
| Polyether polyol (B) (PPG) |  |  | G-3000 | G-700 | G-700 | G-700 | G-700 | G-700 | G-700 |
| Polyol | Ac/PPG (wt %) |  | 100/20 | 100/40 | 100/40 | 100/40 | 100/40 | 100/50 | 100/40 |
|  | Total OHV |  | 168 | 148 | 148 | 148 | 148 | 156 | 151 |
|  | NV (%) |  | 69.5 | 69.5 | 69.1 | 70.1 | 70.0 | 74.1 | 69.3 |
|  | Viscosity (Gardner) |  | X~Y | T~U | V~W | W~X | U~V | P~Q | T~U |
| Solvent |  |  | n-butyl acetate | n-butyl acetate | n-butyl acetate | n-butyl acetate | n-butyl acetate | n-butyl acetate | n-butyl acetate |
| Solvent amount |  |  | 60 | 60 | 60 | 60 | 60 | 50 | 60 |
| Crosslinking agent |  |  | N3300 | N3300 | N3300 | N3300 | N3300 | N3300 | N3300 |
| Mixing ratio |  |  | Equivalent | Equivalent | Equivalent | Equivalent | Equivalent | Equivalent | Equivalent |
| Evaluation results | Appearance |  | ◎ | ◎ | ◎ | ◎ | ◎ | ◎ | ◎ |
|  | Grossiness |  | 93 | 98 | 98 | 97 | 92 | 93 | 97 |
|  | Hardness |  | HB | H | H | F | B | B | H |
|  | φ 2 mm |  | ◎ | ◎ | ◎ | ◎ | ◎ | ◎ | ◎ |
|  | Impact resistance |  | ○ | ○ | ○ | ○ | ○ | ○ | ○ |
| Temperature and time for forced drying (time until emergence of solvent resistance) |  |  | 80° C. 2H | 80° C. 1H | 80° C. 1H | 80° C. 1H | 80° C. 1H | 80° C. 5H | 80° C. 2H |

TABLE 4

|  |  |  | Comparative Example | | |
|---|---|---|---|---|---|
|  |  |  | 1 | 2 | 3 |
| Polyol (A1) | Polymerizable unsaturated monomers (parts) | MAA | 0.7 | 3.2 | 3.2 |
|  |  | HEMA | — | 27 | 15 |
|  |  | HPMA | 30 | — | — |
|  |  | HEA | — | — | — |
|  |  | PX-1 | — | — | — |
|  |  | 4MeOHCHMMA | — | — | — |
|  |  | St | 10 | 20 | — |
|  |  | CHMA | 45 | 40 | — |
|  |  | IB-X | — | — | — |
|  |  | MMA | — | — | 45.3 |
|  |  | t-BMA | — | — | — |
|  |  | i-BMA | — | — | 10 |
|  |  | BMA | — | 9.8 | 14.5 |
|  |  | BA | — | — | — |
|  |  | LMA | — | — | — |
|  |  | 2EHA | 14.3 | — | — |
|  | Tg |  | 34 | 73 | 73 |
|  | Ac-Mn |  | 3000 | 3000 | 4000 |
|  | OHV |  | 117 | 117 | 65 |
| Polyether polyol (B) (PPG) |  |  | — | G-700 | G-700 |
| Polyol | Ac/PPG (wt %) |  | 100/0 | 100/150 | 100/40 |
|  | Total OHV |  | 117 | 148 | 111 |
|  | NV (%) |  | 70.5 | 79.2 | 70.1 |
|  | Viscosity (Gardner) |  | Z$_5$~Z$_6$ | P~Q | X~Y |

TABLE 4-continued

|  |  | Comparative Example | | |
|---|---|---|---|---|
|  |  | 1 | 2 | 3 |
| Solvent |  | n-butyl acetate | n-butyl acetate | n-butyl acetate |
| Solvent amount |  | 43 | 0 | 60 |
| Crosslinking agent |  | N3300 | N3300 | N3300 |
| Mixing ratio |  | Equivalent | Equivalent | Equivalent |
| Evaluation results | Appearance | ◎ | ◎ | ◎ |
|  | Grossiness | 98 | 90 | 90 |
|  | Hardness | 2H | 6B以下 | 3B |
|  | φ2 mm | x | ◎ | ○ |
|  | Impact resistance | x | ○ | ○ |
| Temperature and time for forced drying (time until emergence of solvent resistance) |  | 80° C. 0.5 H | 80° C. 3 H | 80° C. 1 H |

In Tables 1 to 4, the following symbols are used:
Polymerizable Unsaturated Monomer MMA: methyl methacrylate, HEMA: 2-hydroxyethyl methacrylate, HPMA: 2-hydroxypropyl methacrylate, HEA: 2-hydroxyethyl acrylate, PX-1: 2-hydroxypropyl acrylate, 4MeOHCHMA: 4-methylolcyclohexylmethyl acrylate, St: styrene, CHMA: cyclohexyl methacrylate, IB-X: isobornyl methacrylate, MMA: methyl methacrylate, t-BMA: tert-butyl methacrylate, i-BMA: isobutyl methacrylate, BMA: n-butyl methacrylate, BA: n-butyl acrylate, LMA: n-lauryl methacrylate, 2EHA: 2-ethylhexyl acrylate, LA-82: Adekastab LA-82 (trademark, product of Asahi Denka Kogyo), 4MCHMMA: 4-methylcyclohexylmethyl methacrylate, CHMMA: cyclohexylmethyl methacrylate, CHA: cyclohexyl acrylate.

Polyols (A1) or Polyols (A2)

Tg: glass transition point of polyol (A1) or polyol (A2), Ac-Mn: number average molecular weight of polyol (A1) or polyol (A2), OHV: hydroxyl value of polyol (A1) or polyol (A2). (Polyether polyol (B))

PPG: polyether polyol, G-700: (trademark, product of Asahi Denka Kogyo), G-3000: (trademark, product of Asahi Denka Kogyo), P-400: (trademark, product of Asahi Denka Kogyo), EDP-1100: (trademark, product of Asahi Denka Kogyo).

Polyols

Ac/PPG: polyol (A1) or polyol (A2)/polyether polyol (B) weight ratio, total OHV: hydroxyl value of polyol, NV (%): nonvolatile matter content of resin composition for coatings, Vis (Gardner): viscosity of resin composition for coatings as measured at 25° C. using a Gardner tube.

Solvent Amount

The amount (parts) of solvent added per 100 parts of polyol (A1) or polyol (A2)

Crosslinking Agents

N 3300: trademark Sumidur N 3300, product of Sumitomo Bayer Urethane, BL 3175: trademark Sumidur BL 3175, product of Sumitomo Bayer Urethane, Cymel 325: trademark, product of Mitsui Cytec.

Evaluation Results

Hardness: Pencil Hardness.

φ2 mm; the results are given of a flex test prescribed in JIS K 5400 8.1 (rod diameter: 2 mm). Temperature and time of forced drying (time until physical property development): temperature carrying out forced drying and time until development of solvent resistance.

As is evident from Table 1, Table 2 and Table 3, it was found that the curable coating compositions of Examples 1 to 27 can form coatings excellent in basic performance characteristics such as hardness and luster and, in addition, having good flexibility. It was further found that when the polyol (A1) has a cycloalkyl structure, coating films with high weathering resistance can be obtained. While the same effects can be obtained by using the polyol (A2) instead of the polyol (A1), the use of polyol (A2) is more preferred in view of obtaining high solid composition.

As is evident from Table 4, the cured coating films formed by using the curable coating composition of Comparative Example 1 with no polyether polyol (B) contained therein were high in hardness but poor in flexibility. The cured coating films formed by using the curable coating composition of Comparative Example 2 in which the proportion of the polyether polyol (B) was high as compared with the polyol (A1) were low in hardness. The coating films obtained from the curable coating composition of Comparative Example 3 were low in hardness.

Examples 28 and 29

According to Table 5, curable coating compositions were prepared by incorporating Sumidur N 3300 as the curing agent in the resin composition for coatings as obtained in Example 5 or Example 26 in an amount such that the equivalent ratio between hydroxyl groups in the resin composition for coatings and isocyanato groups amounted to 1:1 and further adding the temperature-sensitive catalyst mono-n-butyltin fatty acid salt (trademark: SCAT-24, product of Sankyo Yuki Gosei) at an addition amount specified in Table 5. The addition amount is shown in terms of ppm relative to 100% by weight of the resin composition for coatings. The viscosity of each curable coating composition obtained was adjusted to 10 seconds as measured with an Iwata cup by dilution with a thinner composed of toluene/xylene/n-butyl acetate (weight ratio=1/1/1), whereby a clear coating composition having a viscosity enabling application thereof by air spraying.

Then, each clear coating obtained was applied, by air spraying to a dry film thickness of about 30 μm, to white panels then maintained at room temperature for 5 minutes, and forcedly dried. The coating films thus formed each had a good appearance and each time for forced drying necessary for solvent resistance was short.

TABLE 5

|  | Example 28 | Example 29 |
|---|---|---|
| Resin Used | Example 5 | Example 26 |
| Catalyst amount | 5000 ppm | 1000 ppm |
| Appearance | ◎ | ◎ |
| Temp. and time for forced drying (time until development of physical properties) | 80° C. × 20 min | 80° C. × 30 min |

Examples 30 to 33

Curable coating compositions were prepared by incorporating Sumidur N 3300 as the curing agent in the resin composition for coatings as obtained in Example 1, Example 5 or Example 18 in an amount such that the equivalent ratio between hydroxyl groups in the resin composition for coatings and isocyanato groups amounted to 1:1 and further adding a metal-containing organic compound and an acidic substance each specified in Table 6 at respective addition amounts specified in Table 6. The addition amounts of the metal-containing organic compound and acidic substance are respectively shown in terms of ppm relative to the solid matter in the resin composition for coatings. The viscosity of each curable coating composition obtained was adjusted to 10 seconds as measured with an Iwata cup by dilution with a thinner composed of toluene/xylene/n-butyl acetate (weight ratio=1/1/1), whereby a clear coating having a viscosity enabling application thereof by air spraying.

Then, each clear coating obtained was applied, by air spraying to a dry film thickness of about 30 μm, to white panels then maintained at room temperature for 5 minutes, and forcedly dried. The coating films thus formed each had a good appearance and each time for forced drying necessary for solvent resistance was short.

TABLE 6

| | Example 30 | Example 31 | Example 32 | Example 33 |
|---|---|---|---|---|
| Resin used | Example 1 | Example 1 | Example 5 | Example 18 |
| Metal-containing organic compound and amount thereof (ppm/resin solids) | DBTDL/1000 ppm | BiOct/1500 ppm | ZnOct/2000 ppm | DBTDCl/500 ppm |
| Acidic substance and amount thereof (ppm/resin solids) | Propionic acid/5000 ppm | Propionic acid/15000 ppm | Hexanoic acid/10000 ppm | Acetic acid/15000 ppm |
| Appearance | ⊚ | ⊚ | ⊚ | ⊚ |
| Temperature and time for forced drying (time until development of physical properties) | 80° C. × 0.5 H | 80° C. × 0.5 H | 80° C. × 0.5 H | 80° C. × 0.5 H |

The symbols used in Table 6 are as follows:
DBTDL: dibutyltin dilaurate, DBTDCl: dibutyltin dichloride, BiOct: bismuth 2-ethylhexanoate, ZnOct: zinc 2-ethylhexanoate.

What is claimed is:

1. A resin composition for coatings comprising a polyol (A1), a polyether polyol (B) and a solvent (C),
wherein the weight ratio between said polyol (A1) and said polyether polyol (B) is 50/50 to 90/10,
the weight ratio between the sum of said polyol (A1) and polyether polyol (B), and the solvent (C) is 40/60 to 90/10,
and said polyol (A1) comprises the product of copolymerization of a polymerizable unsaturated monomer composition,
said polymerizable unsaturated monomer composition comprising 5.0 to 80.0% by weight of a hydroxyl-containing polymerizable unsaturated monomer and 20.0 to 95.0% by weight of another polymerizable unsaturated monomer
while having 10.0 to 100.0% by weight of a ring structure-containing polymerizable unsaturated monomer, per 100% by weight of said monomer composition.

2. A resin composition for coatings comprising a polyol (A2), a polyether polyol (B) and a solvent (C),
wherein the weight ratio between said polyol (A2) and said polyether polyol (B) is 50/50 to 90/10,
the weight ratio between the sum of said polyol (A2) and polyether polyol (B), and the solvent (C) is 40/60 to 90/10,
and said polyol (A2) comprises the product of copolymerization of a polymerizable unsaturated monomer composition,
said polymerizable unsaturated monomer composition comprising 20.0 to 75.0% by weight of a hydroxyl-containing polymerizable unsaturated monomer, 25.0 to 80.0% by weight of another polymerizable unsaturated monomer
while having 25.0 to 80.0% by weight of a linear branched structure-containing polymerizable unsaturated monomer, per 100% by weight of said monomer composition,
said linear branched structure-containing polymerizable unsaturated monomer having an SP value of not more than 9.5 and capable of giving a homopolymer with a glass transition point (Tg) not lower than 60° C.

3. The resin composition for coatings according to claim 1,
wherein said polyether polyol (B) comprises a polyether polyol having, on an average, 2 to 4 hydroxyl groups per molecule and a mean hydroxyl value of 30 to 600 mg KOH/g.

4. A curable coating composition
which comprises the resin composition for coatings according to claim 1, and a crosslinking agent.

5. The curable coating composition according to claim 4
wherein said crosslinking agent comprises a (blocked) polyisocyanate compound as an essential constituent
and said curable coating composition comprises an metal-containing organic compound and an acidic substance.

6. The curable coating composition according to claim 4
wherein said crosslinking agent comprises a (blocked) polyisocyanate compound as an essential constituent
and said curable coating composition comprises a temperature-sensitive catalyst.

7. The resin composition for coatings according to claim 2,
wherein said polyether polyol (B) comprises a polyether polyol having, on an average, 2 to 4 hydroxyl groups per molecule and a mean hydroxyl value of 30 to 600 mg KOH/g.

8. A curable coating composition
which comprises the resin composition for coatings according to claim 2, and a crosslinking agent.

* * * * *

UNITED STATES PATENT AND TRADEMARK OFFICE
CERTIFICATE OF CORRECTION

PATENT NO. : 6,713,551 B2  Page 1 of 1
DATED : March 30, 2004
INVENTOR(S) : Kunio Takahashi et al.

It is certified that error appears in the above-identified patent and that said Letters Patent is hereby corrected as shown below:

Title page,
Item [75], Inventors, please change "Hameji" to -- Himeji --.
Insert Item -- [30]  Foreign Application Priority Data
  July 19, 2000  [JP]  Japan  2000-219765 --.

Signed and Sealed this

Twenty-fourth Day of May, 2005

JON W. DUDAS
*Director of the United States Patent and Trademark Office*